(12) United States Patent
Depraete et al.

(10) Patent No.: US 9,845,854 B2
(45) Date of Patent: *Dec. 19, 2017

(54) HYDROKINETIC TORQUE COUPLING DEVICE HAVING TURBINE-PISTON LOCK-UP CLUTCH, AND RELATED METHODS

(71) Applicant: VALEO EMBRAYAGES, Amiens (FR)

(72) Inventors: Alexandre Depraete, Bloomfield, MI (US); Sungchul Lee, Troy, MI (US); Michel Bacher, Marseilles (FR)

(73) Assignee: Valeo Embrayages (FR)

( * ) Notice: Subject to any disclaimer, the term of this patent is extended or adjusted under 35 U.S.C. 154(b) by 147 days.

This patent is subject to a terminal disclaimer.

(21) Appl. No.: 14/522,302

(22) Filed: Oct. 23, 2014

(65) Prior Publication Data

US 2016/0116038 A1    Apr. 28, 2016

(51) Int. Cl.
*F16H 45/02*    (2006.01)
*F16H 41/30*    (2006.01)

(52) U.S. Cl.
CPC ............ *F16H 45/02* (2013.01); *F16H 41/30* (2013.01); *F16H 2045/0205* (2013.01); *F16H 2045/0215* (2013.01); *F16H 2045/0221* (2013.01); *F16H 2045/0278* (2013.01)

(58) Field of Classification Search
CPC ............ F16H 45/02; F16H 2045/0205; F16H 2045/0221

See application file for complete search history.

(56) References Cited

U.S. PATENT DOCUMENTS

| 2,130,895 A | 9/1938 | Ness |
| 2,860,747 A | 11/1958 | Kelley |
| 2,992,713 A | 7/1961 | Stump et al. |

(Continued)

FOREIGN PATENT DOCUMENTS

| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter 20, pp. 280-301.

(Continued)

*Primary Examiner* — Stacey Fluhart
(74) *Attorney, Agent, or Firm* — Berenato & White, LLC

(57) ABSTRACT

A hydrokinetic torque coupling device features a casing including a casing shell and an impeller casing shell, an impeller including the impeller shell, a turbine-piston including a turbine-piston shell, and a restriction element. The turbine-piston shell includes a turbine-piston flange and partitions the interior volume of the casing into two chambers. The turbine-piston flange has an engagement surface movable axially toward and away from an engagement surface of a piston engagement portion of the impeller shell to position the hydrokinetic torque coupling device into and out of a lockup mode. The restriction element is configured to restrict fluid flow and create a pressure drop between the first and second chambers.

20 Claims, 30 Drawing Sheets

(56) References Cited

U.S. PATENT DOCUMENTS

| | | | |
|---|---|---|---|
| 3,041,892 A | 7/1962 | Schjolin | |
| 3,184,019 A | 5/1965 | Le Brise | |
| 3,252,352 A | 5/1966 | General et al. | |
| 4,041,701 A | 8/1977 | Goto et al. | |
| 5,655,368 A * | 8/1997 | Koike | F16H 45/02 192/208 |
| 5,713,442 A | 2/1998 | Murata et al. | |
| 5,813,505 A | 9/1998 | Olsen et al. | |
| 6,026,940 A | 2/2000 | Sudau | |
| 6,102,175 A * | 8/2000 | Yamaguchi | F16H 45/02 192/3.29 |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 7,878,313 B2 * | 2/2011 | Cmich | F16H 45/02 192/112 |
| 8,276,723 B2 | 10/2012 | Verhoog et al. | |
| 8,479,901 B2 | 7/2013 | Engelmann | |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2006/0086584 A1 | 4/2006 | Maucher et al. | |
| 2008/0277227 A1 * | 11/2008 | Jameson | F16H 45/02 192/3.33 |
| 2009/0020385 A1 | 1/2009 | Nakamura | |
| 2010/0236228 A1 | 9/2010 | Degler | |
| 2012/0241273 A1 | 9/2012 | Kawahara | |
| 2013/0205944 A1 * | 8/2013 | Sudau | F16F 15/1315 74/573.1 |
| 2013/0230385 A1 | 9/2013 | Lindemann et al. | |
| 2014/0014454 A1 | 1/2014 | Davis | |
| 2014/0014455 A1 | 1/2014 | Davis | |
| 2014/0097055 A1 * | 4/2014 | Lindemann | F16H 41/24 192/3.21 |
| 2014/0110207 A1 | 4/2014 | Davis | |
| 2015/0027111 A1 * | 1/2015 | Steinberger | F16D 33/18 60/338 |
| 2015/0068857 A1 * | 3/2015 | Lindemann | F16D 33/18 192/3.28 |
| 2015/0198064 A1 * | 7/2015 | Schrader | F16H 41/04 415/1 |
| 2015/0362041 A1 | 12/2015 | Lee et al. | |
| 2017/0023117 A1 * | 1/2017 | Depraete | F16D 25/0635 |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2706967 A1 | 12/1994 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |
| WO | WO2015013213 A1 | 1/2015 |

OTHER PUBLICATIONS

Machine Translation of EP 0125428 downloaded from EPO.org on Jul. 22, 2016.
U.S. Appl. No. 14/510,244, filed Oct. 9, 2014, First Named Inventor: Alexandre Depraete.
U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.
Corresponding ISR of PCT/EP2015/074574 dated Apr. 13, 2016.

* cited by examiner

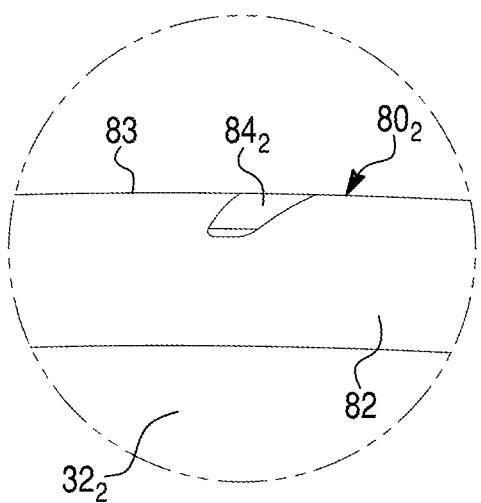

HYDROKINETIC TORQUE COUPLING DEVICE HAVING TURBINE-PISTON LOCK-UP CLUTCH, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lock-up clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lock-up clutches and their operation are described in, for example, U.S. Pat. Nos. 8,276,723 and 7,191,879.

While hydrokinetic torque coupling devices with lock-up clutches have proven to be acceptable for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, a hydrokinetic torque coupling device is provided for coupling a driving shaft and a driven shaft. The torque coupling device includes a casing including a casing shell and an impeller shell disposed axially opposite the casing shell fixedly connected thereto, an impeller including the impeller shell and a piston engagement portion having a first engagement surface, a turbine-piston including a turbine-piston shell with a turbine-piston flange, and a restriction element. The turbine-piston shell partitions an interior volume of the casing into a first chamber between the impeller shell and the turbine-piston shell and a second chamber between the turbine-piston shell and the casing shell. The turbine-piston flange has a second engagement surface that faces the first engagement surface and is movable axially toward and away from the first engagement surface of the piston engagement portion to position the hydrokinetic torque coupling device into and out of a lockup mode in which the turbine-piston is mechanically locked to the piston engagement portion so as to be non-rotatable relative to the casing. The restriction element is configured to restrict fluid flow and create a pressure drop between the first and second chambers when the hydrokinetic torque coupling device is out of the lockup mode.

According to a second aspect of the invention, a method is provided for assembling a hydrokinetic torque coupling device for coupling a driving shaft and a driven shaft together. The method involves providing a torque converter that features an impeller including an impeller shell and a piston engagement portion having a first engagement surface, and a turbine-piston including a turbine-piston shell having a turbine-piston flange with a second engagement surface facing the first engagement surface and movable axially toward and away from the first engagement surface to position the hydrokinetic torque coupling device into and out of a lockup mode in which the turbine-piston is mechanically locked with so as to be non-rotatable relative to the piston engagement portion. The torque converter is combined with a restriction element and a casing shell so that the casing shell and the impeller shell collectively establish a casing of the hydrokinetic torque coupling device. The turbine-piston shell is positioned in the casing to partition an interior volume of the casing into a first chamber between the impeller shell and the turbine-piston shell and a second chamber between the turbine-piston shell and the casing shell. The restriction element is positioned in the casing to restrict fluid flow and create a pressure drop between the first and second chambers when the hydrokinetic coupling device is out of the lockup mode.

A third aspect of the invention provides a method of coupling a driving shaft and a driven shaft together with a hydrokinetic torque coupling device. The hydrokinetic torque coupling device features at least a casing including a casing shell fixed to an impeller shell, an impeller including the impeller shell and a piston engagement portion having a first engagement surface, a turbine-piston including a turbine-piston shell having a turbine-piston flange with a second engagement surface, and a restriction element. The turbine-piston shell partitions an interior volume of the casing into a first chamber between the impeller shell and the turbine-piston shell and a second chamber between the turbine-piston shell and the casing shell. The driving shaft and the driven shaft are operatively connected to input and output parts of the hydrokinetic torque coupling device. Axial movement of the second engagement surface of the turbine-piston is controlled toward and away from the first engagement surface of the piston engagement portion to position the hydrokinetic torque coupling device into and out of a lockup mode in which the turbine-piston is mechanically locked with so as to be non-rotatable relative to the piston engagement portion. Fluid flow between the first and second chambers is restricted with the restriction element when the hydrokinetic torque device is out of the lockup mode to create a pressure drop between the first and second chambers.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 10 is an enlarged view of a fragment of the turbine-piston shown in the circle "C" of FIG. 9B;

Figure 23:
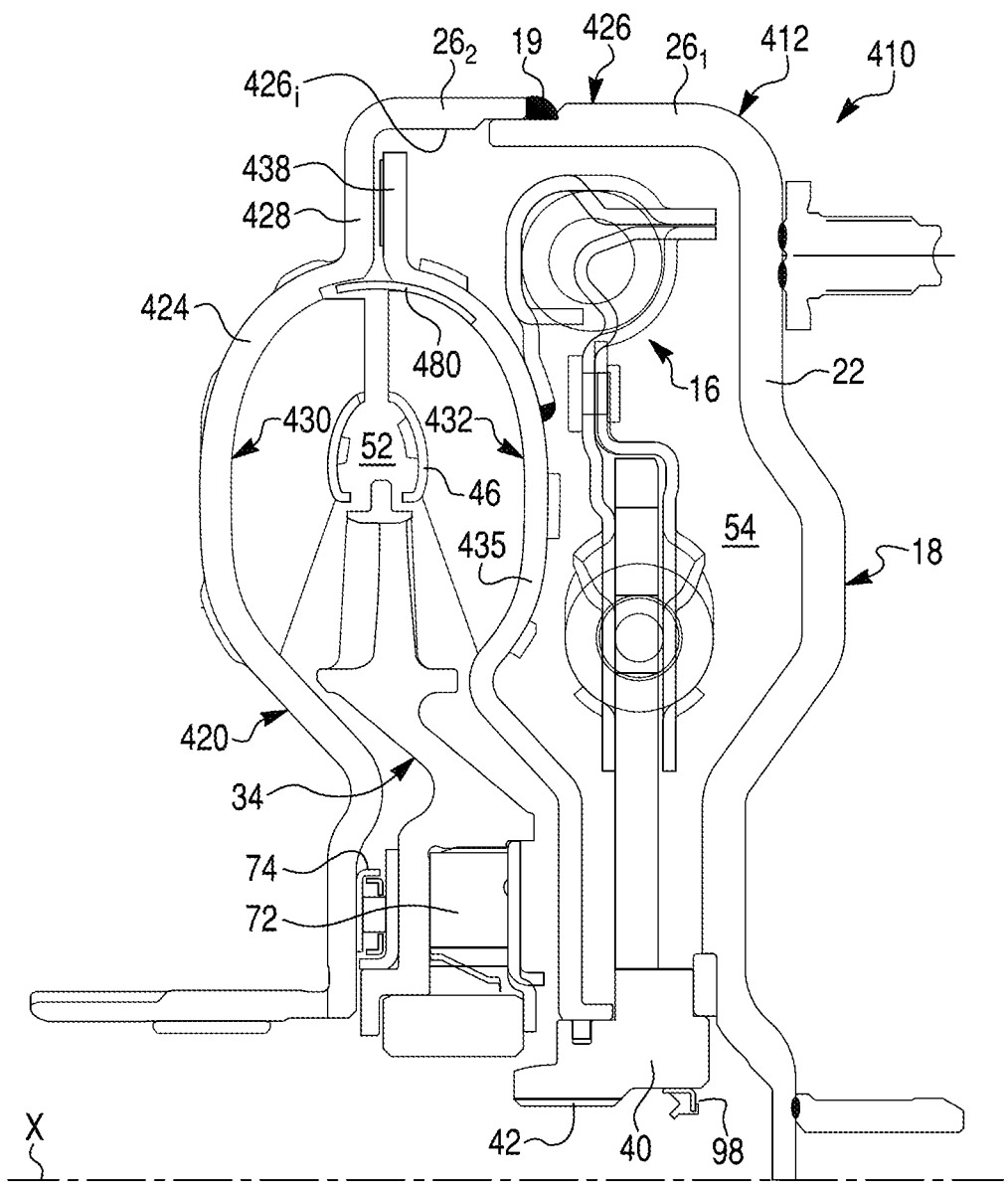
FIG. 23 is a fragmented half-view in axial section of a hydrokinetic torque coupling device in accordance with a fifth exemplary embodiment of the present invention.
Figure 25:
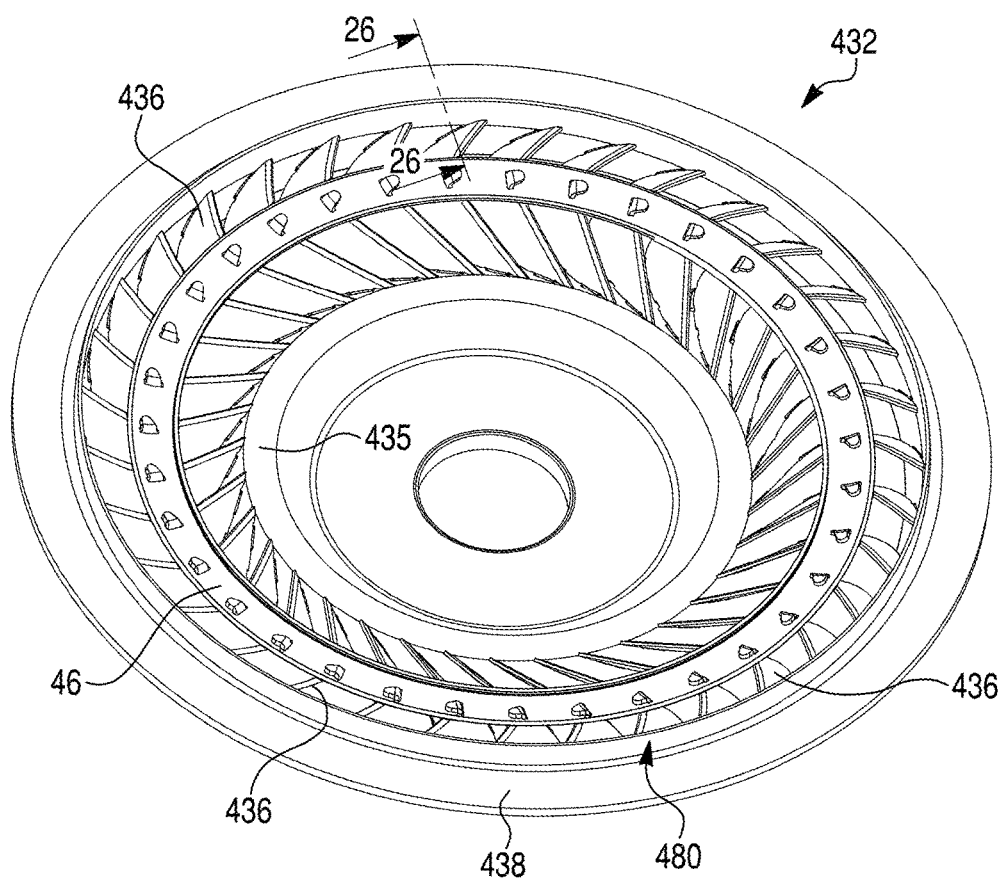
Figure 26:
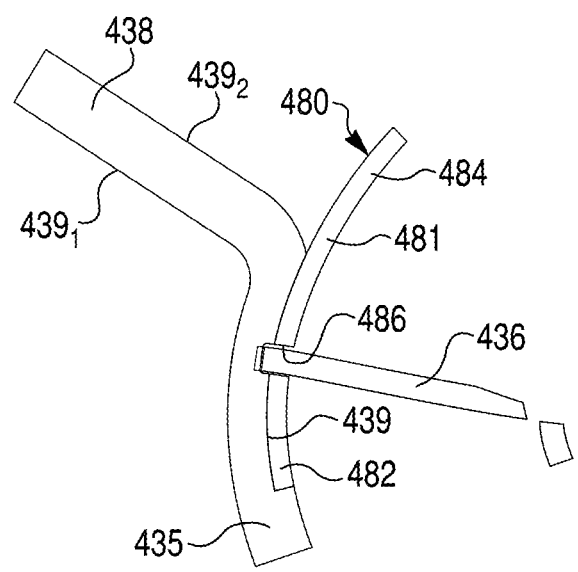
Figure 27:
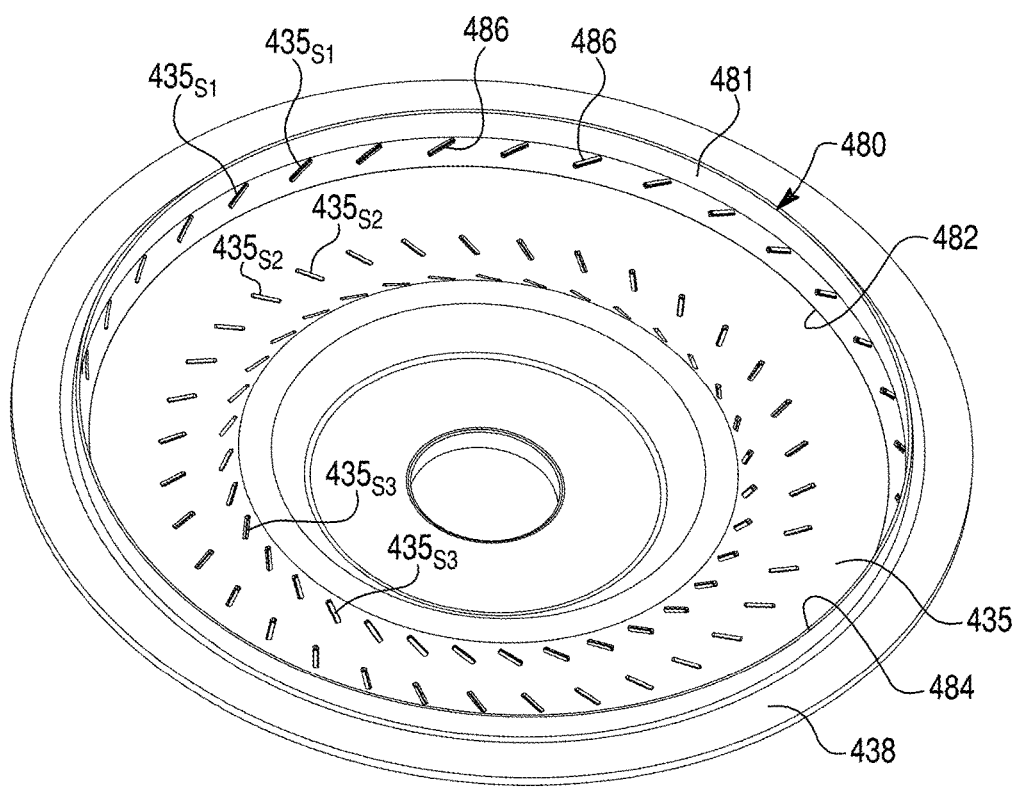
Figure 28:
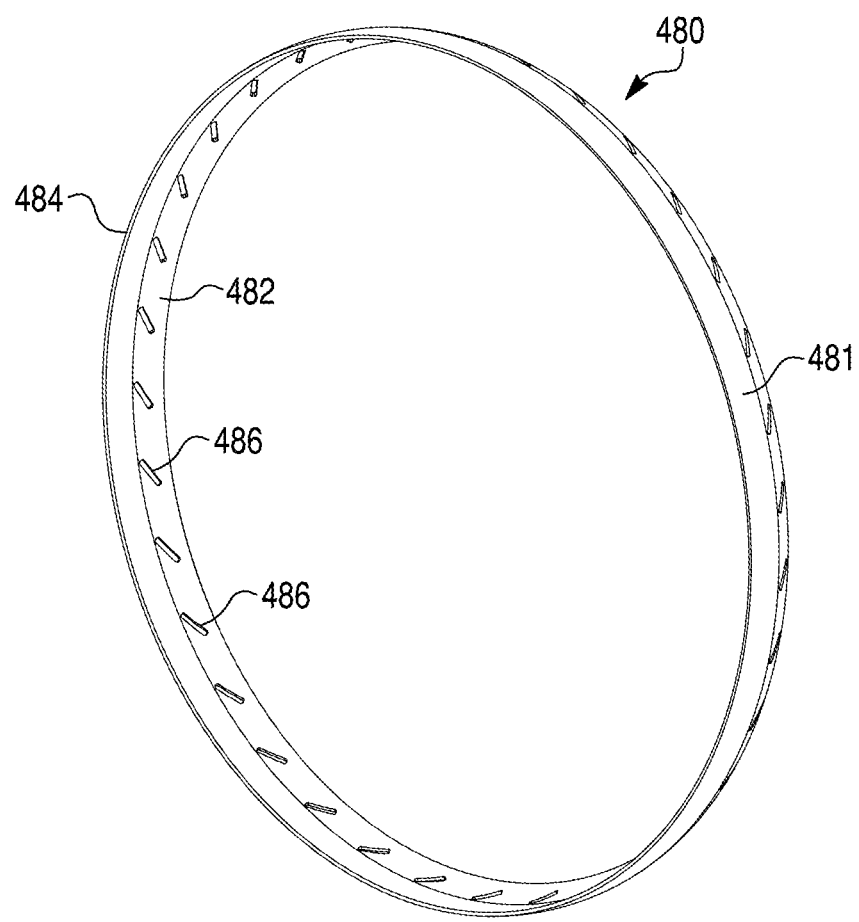
Figure 29:
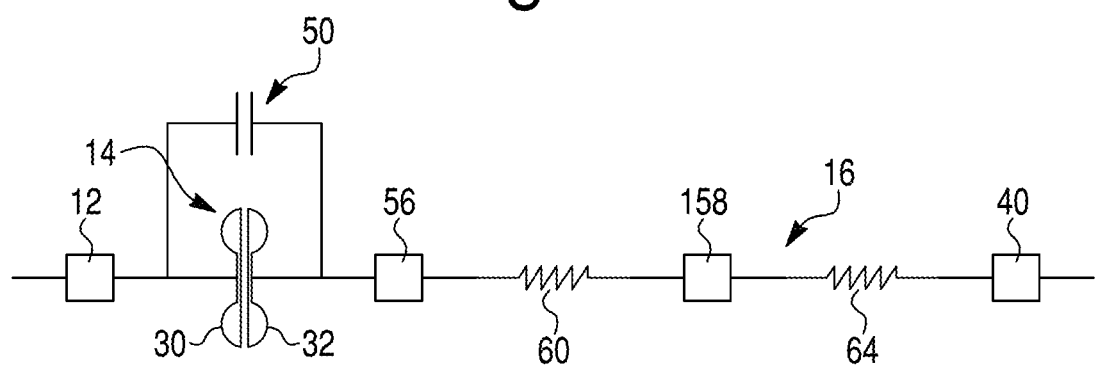
Figure 30:
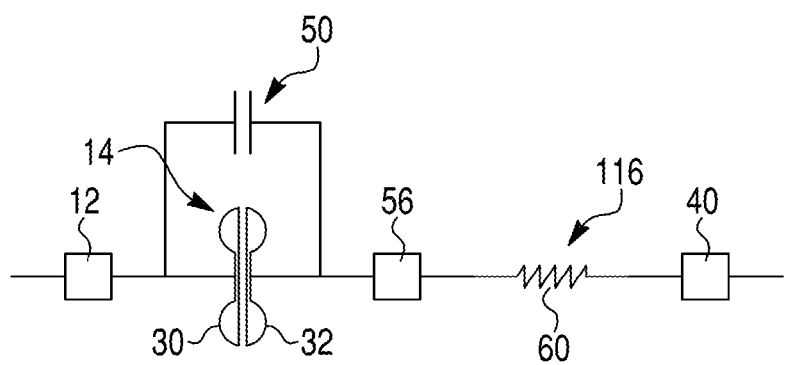
Figure 31:
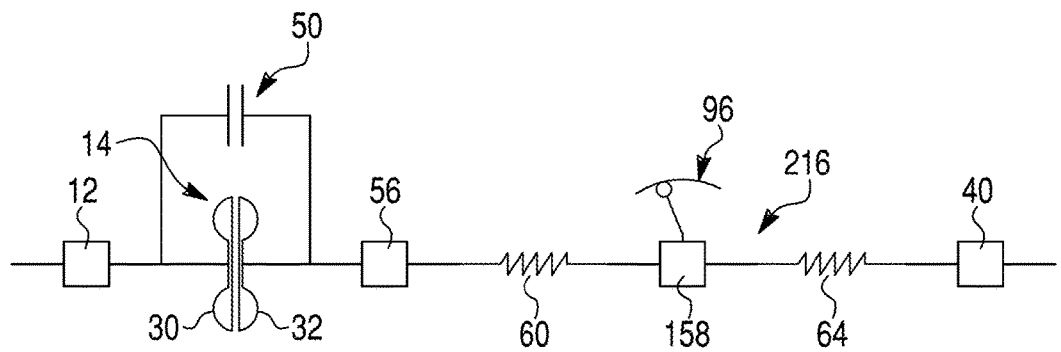
Figure 32:
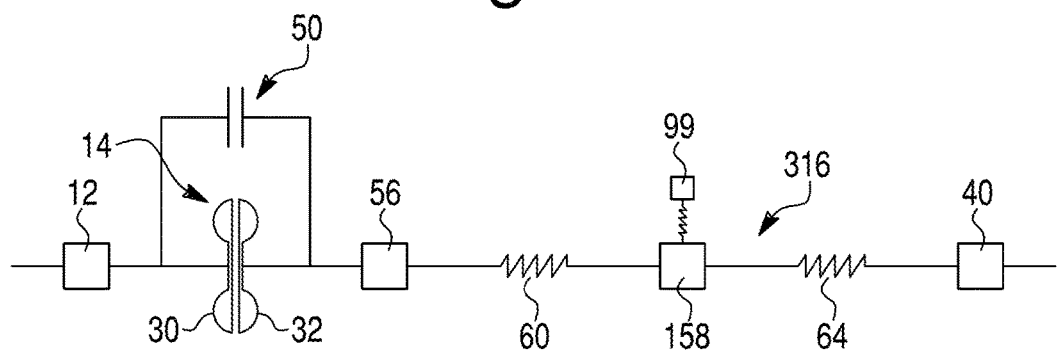

FIG. 25 a perspective view of a turbine-piston of the hydrokinetic torque coupling device of FIG. 23;

FIG. 26 is a cross-sectional view of the turbine-piston taken along the lines 26-26 in FIG. 25;

FIG. 27 is a perspective view of a turbine-piston shell of the turbine-piston of FIG. 25;

FIG. 28 is a perspective view of a restriction element in accordance with the fifth exemplary embodiment of the present invention;

FIG. 29 is a simplified diagram of a hydrodynamic torque coupling device including a turbine-piston with dual or double damper assemblies;

FIG. 30 is a simplified diagram of another hydrodynamic torque coupling device including a turbine-piston with a single damper assembly;

FIG. 31 is a simplified diagram of still another hydrodynamic torque coupling device including a turbine-piston with dual or double damper assemblies and a pendulum vibration absorber, and FIG. 32 is a simplified diagram of a further hydrodynamic torque coupling device including a turbine-piston with dual or double damper assemblies and a vibration absorbing spring-mass system.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

Figure 1:
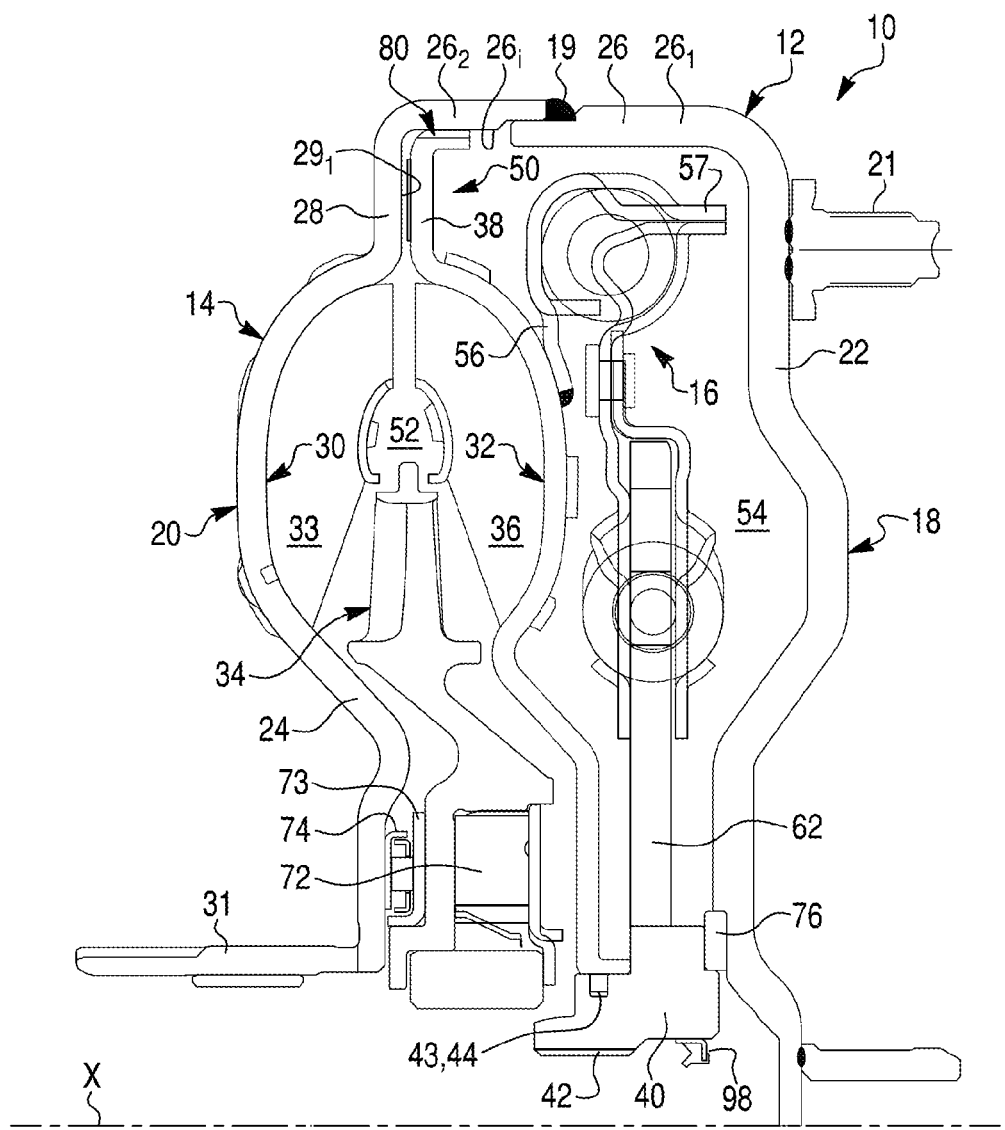
FIG. 1 is a fragmented half-view in axial section of a hydrokinetic torque coupling device in accordance with a first exemplary embodiment of the present invention.

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable in known manner to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. A hydrodynamic torque converter 14 and a torsional vibration damper (also referred to herein as a damper assembly) 16 are both situated in the sealed casing 12. The casing 12, torque converter 14, and torsional vibration damper 16 are all rotatable about a rotational axis X. The drawings discussed herein show half-views, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively. The term "integral with" is defined herein as "non-moveable relative to".

The sealed casing 12 according to the first exemplary embodiment as illustrated in FIG. 1 includes a first casing shell 18 and a second casing shell 20 non-movably (i.e., fixedly) interconnected sealingly together, such as by welding at weld 19 at their outer peripheries. The first casing shell 18 is non-movably (i.e., fixedly) interconnected to the driving shaft, more typically a flywheel (not shown) that is fixed so as to be non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be made, for example, integrally by press-forming one-piece metal sheets.

The first casing shell 18 includes a first sidewall 22 extending substantially radially relative to the direction from the rotational axis X (i.e., in a plane that is generally transverse to the rotational axis X) and a cylindrical first outer wall $26_1$ extending substantially axially from the first sidewall 22 toward the second casing shell 20. Similarly, the second casing shell 20 includes a second sidewall 24 extending substantially radially relative to the direction from the rotational axis X and a cylindrical second outer wall $26_2$ extending substantially axially from the second sidewall 24 toward the first casing shell 18. The second sidewall 24 includes an integral piston engagement portion 28 having a first engagement surface $29_1$, best shown in FIG. 2. The piston engagement portion 28 is embodied as integral with the second sidewall 24 of the second casing shell 20, e.g., made of a single or unitary component. The first and second outer walls $26_1$, $26_2$ collectively establish an annular outer wall portion 26 of the casing 12, which is substantially parallel with the rotation axis X. The weld 19 fixedly secures the outer walls $26_1$ and $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The first casing shell 18 includes a first sidewall 22 extending substantially radially relative to the direction from the rotational axis X (i.e., in a plane that is generally transverse to the rotational axis X) and a cylindrical first outer wall $26_1$ extending substantially axially from the first sidewall 22 toward the second casing shell 20. Similarly, the second casing shell 20 includes a second sidewall 24 extending substantially radially relative to the direction from the rotational axis X and a cylindrical second outer wall $26_2$ extending substantially axially from the second sidewall 24 toward the first casing shell 18. The second sidewall 24 includes an integral piston engagement portion 28 having a first engagement surface $29_1$, best shown in FIG. 2. The piston engagement portion 28 is embodied as integral with (i.e., non-moveable relative to) the second sidewall 24 of the second casing shell 20, e.g., made of a single or unitary component. The first and second outer walls $26_1$, $26_2$ collectively establish an annular outer wall portion 26 of the casing 12, which is substantially parallel with the rotation axis X. The weld 19 fixedly secures the outer walls $26_1$ and $26_2$ together.

Figure 2:
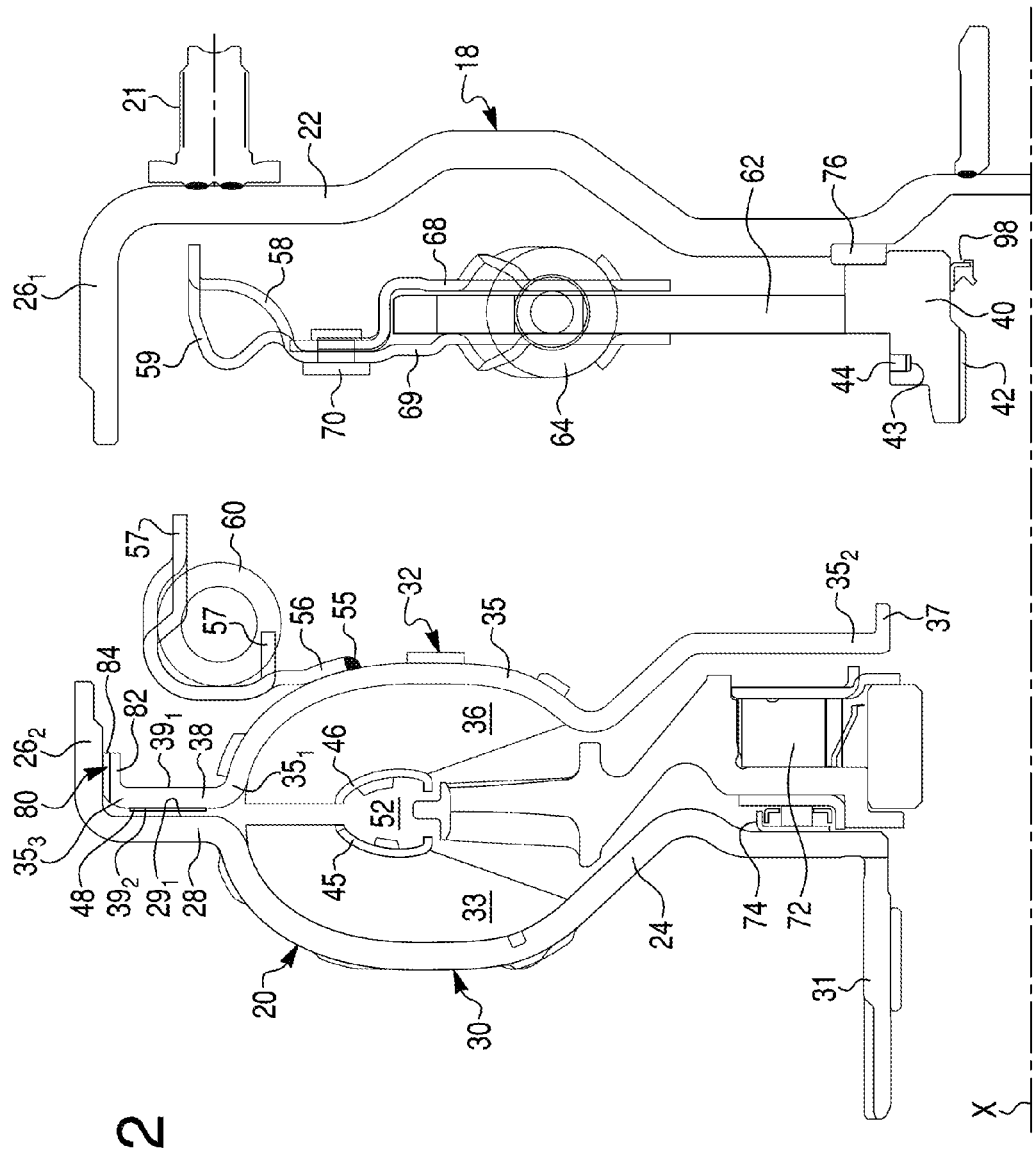
FIG. 2 is an exploded fragmentary cross-sectional view of the hydrokinetic torque coupling device of FIG. 1.

The piston engagement portion 28 is a radial extension of the impeller shell 20, is formed integrally with the impeller shell 20, and, as illustrated in FIG. 1, is disposed radially outside of the impeller blades 33. In other words, the piston engagement portion 28 and the impeller shell 20 are embodied as integral with one another, e.g., made of a single or unitary component. The piston engagement portion 28 of the second sidewall 24 is in the form of a substantially annular, planar wall and extends substantially radially relative to the rotational axis X. The first engagement surface $29_1$ of the piston engagement portion 28 faces a turbine-piston flange 38 (discussed below) and the first casing shell 18, as shown in FIGS. 1 and 2.

The torque coupling device 10 further includes an output hub 40 that is rotatable about the rotational axis X. The output hub 40 is operatively coupled to and coaxial with the driven shaft. For example, the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 98, mounted to a radially inner peripheral surface of the output hub 40, creates a seal at the interface of a transmission input shaft and the output hub 40.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35. The spinning of the impeller 30 causes transmission fluid in the torus to spin the turbine blades 36, and hence the turbine-piston shell 35. The impeller shell 31 and the turbine-piston shell 35 collective define a substantially toroidal first chamber (or torus chamber) 52 therebetween. Referring to FIG. 1, the torus chamber 52 is on the left side of the turbine-piston shell 35, and a second (or damper) chamber 54 is on the other (right) side of the turbine-piston shell 35. In other words, the first chamber 52 is defined between the impeller shell 31 and the turbine-piston shell 35, while the second chamber 54 is defined between the turbine-piston shell 35 and the first casing shell 18, i.e., outside the first chamber 52.

The stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side wall 73 of the stator 34 and the impeller shell 20 of the casing 12.

Extending axially at a radially inner peripheral end 352 of the turbine-piston shell 35 is a substantially cylindrical flange 37 that is proximate to the rotational axis X. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movable relative to the output hub 40 along this interface.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component, but alternatively may be separate components connected together. The turbine-piston flange 38 extends from a radially outer peripheral end $35_1$ of the turbine-piston shell 35 radially outward. The turbine-piston flange 38 extends sufficiently outward radially to axially overlap with the piston engagement portion 28 of the second casing shell 20.

As best shown in FIG. 2, the turbine-piston flange 38 has two axially opposite planar surfaces: a first surface $39_1$ facing the first sidewall 22 of the casing 12, and a second engagement surface $39_2$ facing the piston engagement portion 28 of the second casing shell 20. The first and second engagement surfaces $29_1$ and $39_2$ are parallel to and face one another, and extend radially at a 90 degree angle relative to the rotational axis X. The second engagement surface $39_2$ faces and, as explained below, is movable axially toward and away from the first engagement surface $29_1$ of the casing 12 to position the turbine-piston flange 38 of the turbine-piston 32 respectively into and out of a lockup position.

In accordance with the first exemplary embodiment, the second engagement surface $39_2$ of the turbine-piston flange 38 is provided with a friction ring (or friction lining) 48, best shown in FIG. 2. The friction ring 48 may be secured to the second engagement surface $39_2$, for example, by adhesive bonding and/or with fasteners. The friction ring 48 is made of a friction material for improved frictional performance. Alternatively, a friction ring (or friction lining) may be secured to the first engagement surface $29_1$. According to still another embodiment, a first friction ring or liner is secured to the first engagement surface $29_1$ of the casing 12 and a second friction ring or liner is secured to the second (engagement) surface $39_2$ of the turbine-piston flange 38. It is within the scope of the invention to omit one or both of the friction rings.

Further in accordance with the first exemplary embodiment of the present invention, the turbine-piston 32 includes a restriction element 80 secured or integrally formed as part of the turbine-piston 32 for restricting fluid flow between the first and second chambers 52, 54. The restriction element 80 includes an annular external restrictor flange member 82 extending substantially axially from a distal end $35_3$ of the turbine-piston flange 38 of the turbine-piston 32. According to the first exemplary embodiment of the present invention, the external restrictor flange member 82 is stamped in order to have a generally cylindrical outer diameter. The restriction element 80 restricts the flow of transmission fluid from the torus chamber 52 to the damper chamber 54 so as to create a significant pressure drop. The pressure drop created by the restriction element 80 urges the turbine-piston 32 away from the impeller 30, out of lockup mode.

Figure 3:
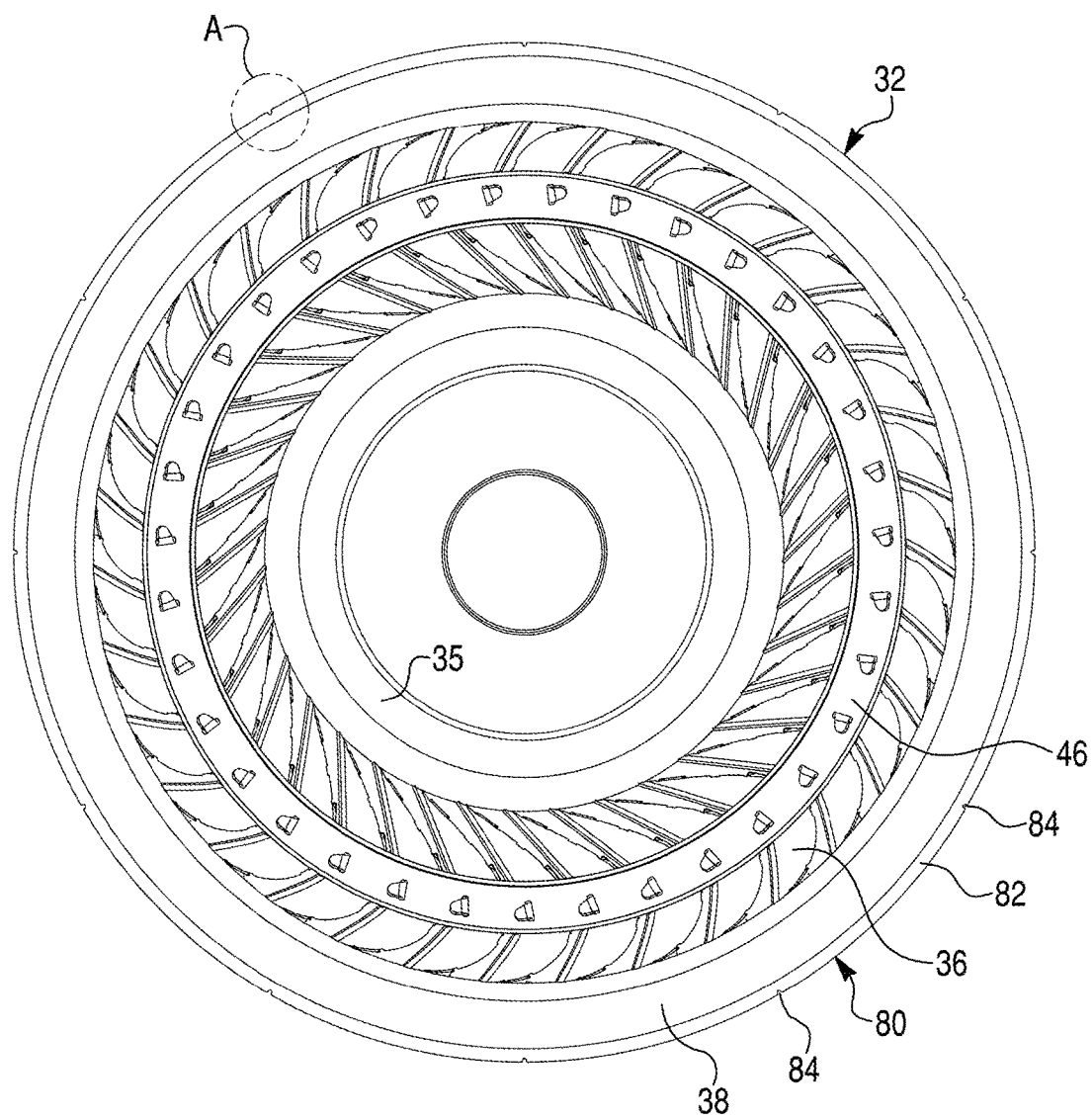
FIG. 3 is a front view of a turbine-piston of the hydrokinetic torque coupling device of FIG. 1.
Figure 4:
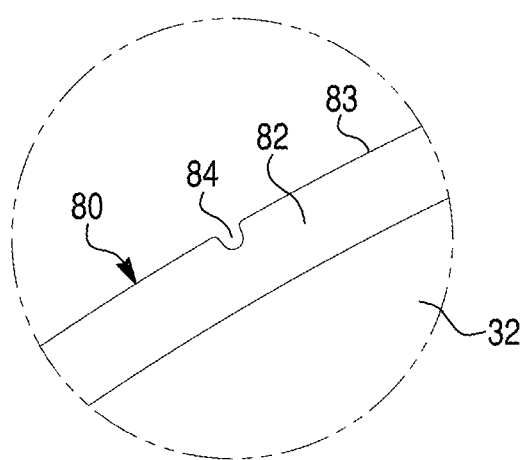
FIG. 4 is an enlarged front view of a fragment of the turbine-piston shown in the circle "A" of FIG. 3.

The external restrictor flange member 82 includes one or more restriction passages, best shown in FIGS. 3 and 4 as axial grooves 84 formed on a cylindrical outer peripheral surface 83 of the restrictor flange member 82. The axial grooves 84 extend axially through the thickness of the external restrictor flange member 82 and are equidistantly circumferentially spaced from one another. The axial grooves 84 are provided to fluidly interconnect the first chamber (or torus chamber) 52 and the second (or damper) chamber 54.

The axial grooves 84 of the restriction element 80 have a calibrated cross-section to maintain at least a minimum of fluid flow between the torus chamber 52 and the damper chamber 54 to cool the torque converter 14. Specifically, the axial grooves 84 of the restriction element 80 are calibrated such that, in the non-lockup (or torque convertor) mode, the hydraulic fluid which flows through the restriction grooves 84 of the restriction element 80 is of sufficient volume to provide an acceptable temperature in the torus chamber 52 in order to prevent degradation of the hydraulic fluid disposed therein. Also, the grooves 84 of the restriction element 80 are calibrated such that, in the lock up mode, the hydraulic fluid which flows through the restriction grooves 84 of the restriction element 80 creates a rapid decrease in load for improvement of the action of the turbine-piston 32. The calibration of the cross-section of the axial groove 84 is performed by routine calculation and testing.

In the illustrated embodiment, the axial grooves 84 face the radially inner peripheral surface 26i of the second outer wall $26_2$ of the casing 12. The restriction passages may alternatively be configured as bores, channels, holes, etc. The restriction passages, including the grooves 84 shown in the illustrated embodiment, may be angled relative to the axial direction. Although shown circumferentially equidistant from one another, it should be understood that the passages may be spaced otherwise, including randomly relative to one another.

Figure 5:
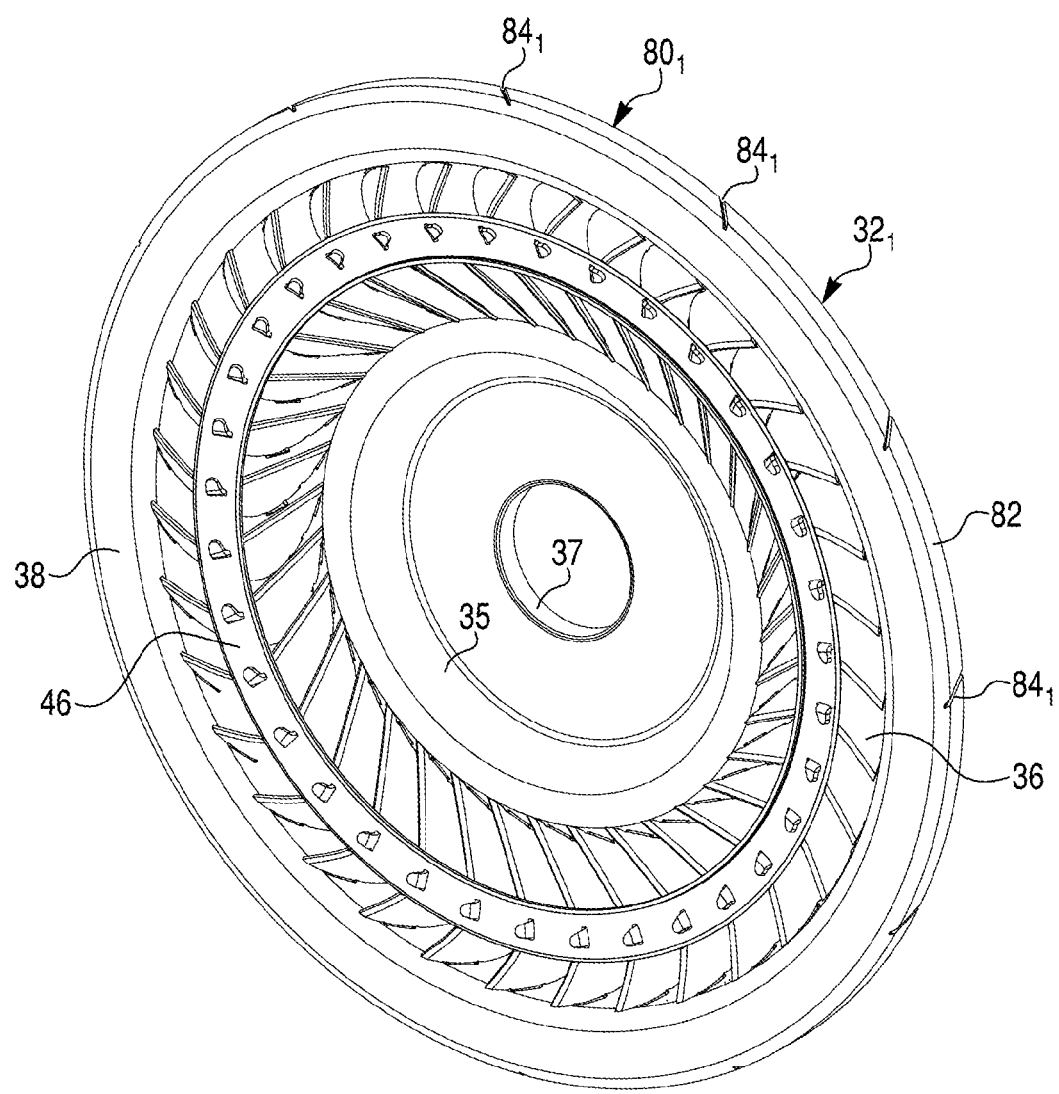
FIG. 5 is a perspective view of an turbine-piston according to the first exemplary embodiment of the present invention.
Figure 6A:
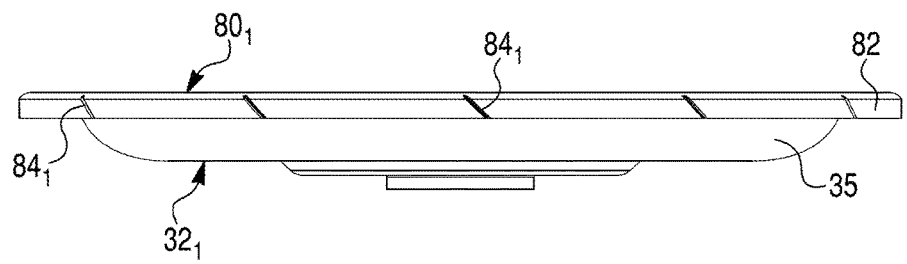
FIG. 6A is a top view of the turbine-piston of FIG. 5.
Figure 6B:
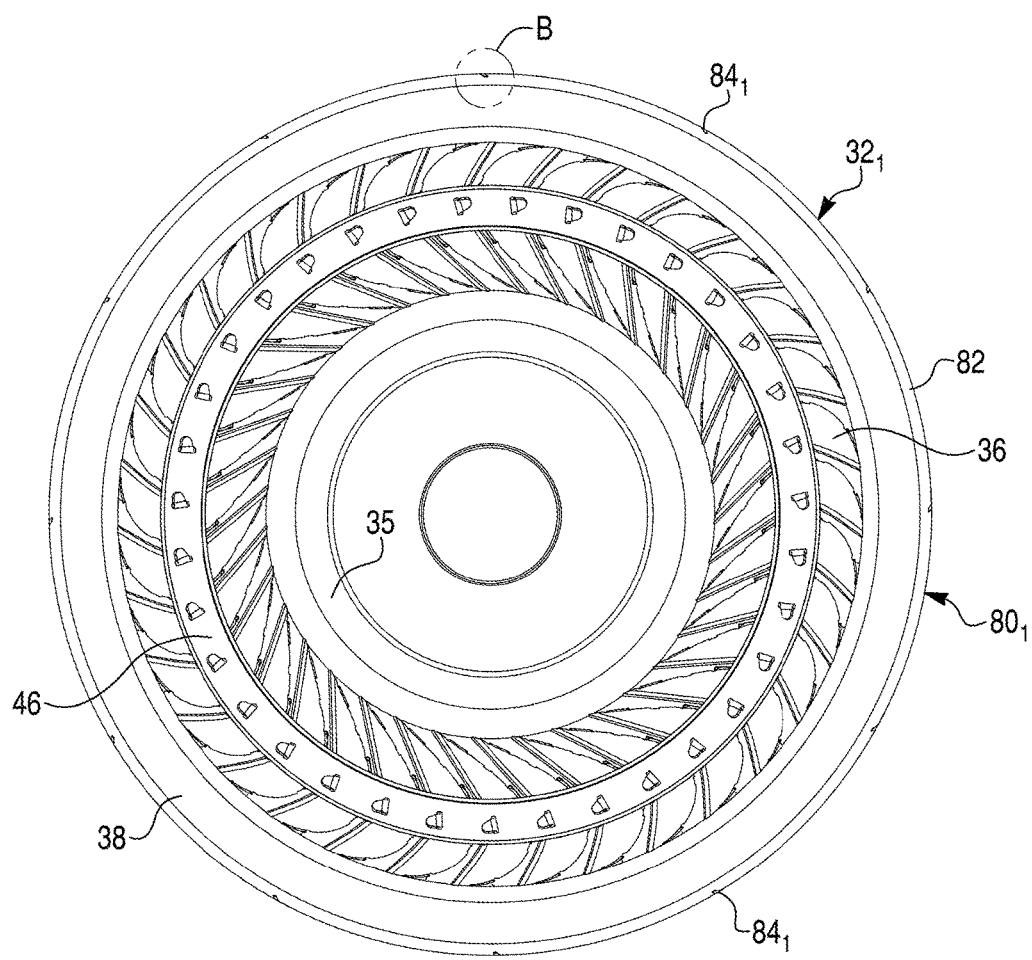
FIG. 6B is a side view of the turbine-piston of FIG. 5.
Figure 7:
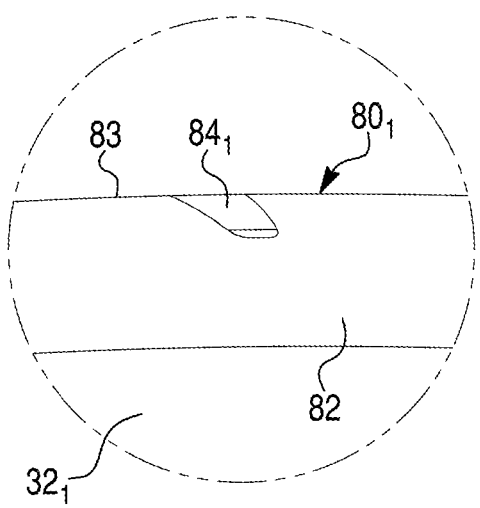
FIG. 7 is an enlarged view of a fragment of the turbine-piston shown in the circle "B" of FIG. 6B.

An alternative turbine-piston $32_1$ includes a restriction element $80_1$ secured to or integrally formed as part of the turbine-piston $32_1$ for restricting fluid flow and creating a pressure drop between the first and second chambers 52, 54. The turbine-piston $32_1$ according to the alternative exemplary embodiment of FIGS. 5-7 corresponds substantially to the turbine-piston 32 of FIGS. 1-4 with only the restriction element $80_1$ differing. Those differences are explained in detail below.

The restriction element $80_1$ includes an annular external restrictor flange member 82 extending substantially axially from a distal end $35_3$ of the turbine-piston flange 38 of the turbine-piston $32_1$. The external restrictor flange member 82 includes one or more restriction passages, best shown in FIGS. 5, 6A and 7 as restriction grooves $84_1$ formed on a cylindrical outer peripheral surface 83 of the restrictor flange member 82. Each of the restriction grooves $84_1$ extends through the thickness of the external restrictor flange member 82 at an oblique angle α relative to the axial direction. Specifically, in reference to a direction that is axially outward from the torus chamber 52 towards the damper chamber 54 (i.e., from left to right in FIGS. 1 and 2), the restriction grooves $84_1$ extend in the direction of rotation of the turbine-piston $32_1$. Although shown circumferentially equidistant from one another, it should be understood that the restriction grooves $84_1$ may be spaced otherwise, including at random intervals relative to one another. The restriction grooves $84_1$ are provided to fluidly interconnect the first chamber (or torus chamber) 52 and the second (or damper) chamber 54. The restriction grooves $84_1$ of the restriction element $80_1$ have a calibrated cross-section to maintain at least a minimum of fluid flow between the torus chamber 52 and the damper chamber 54 to cool the torque converter 14.

Figure 8:
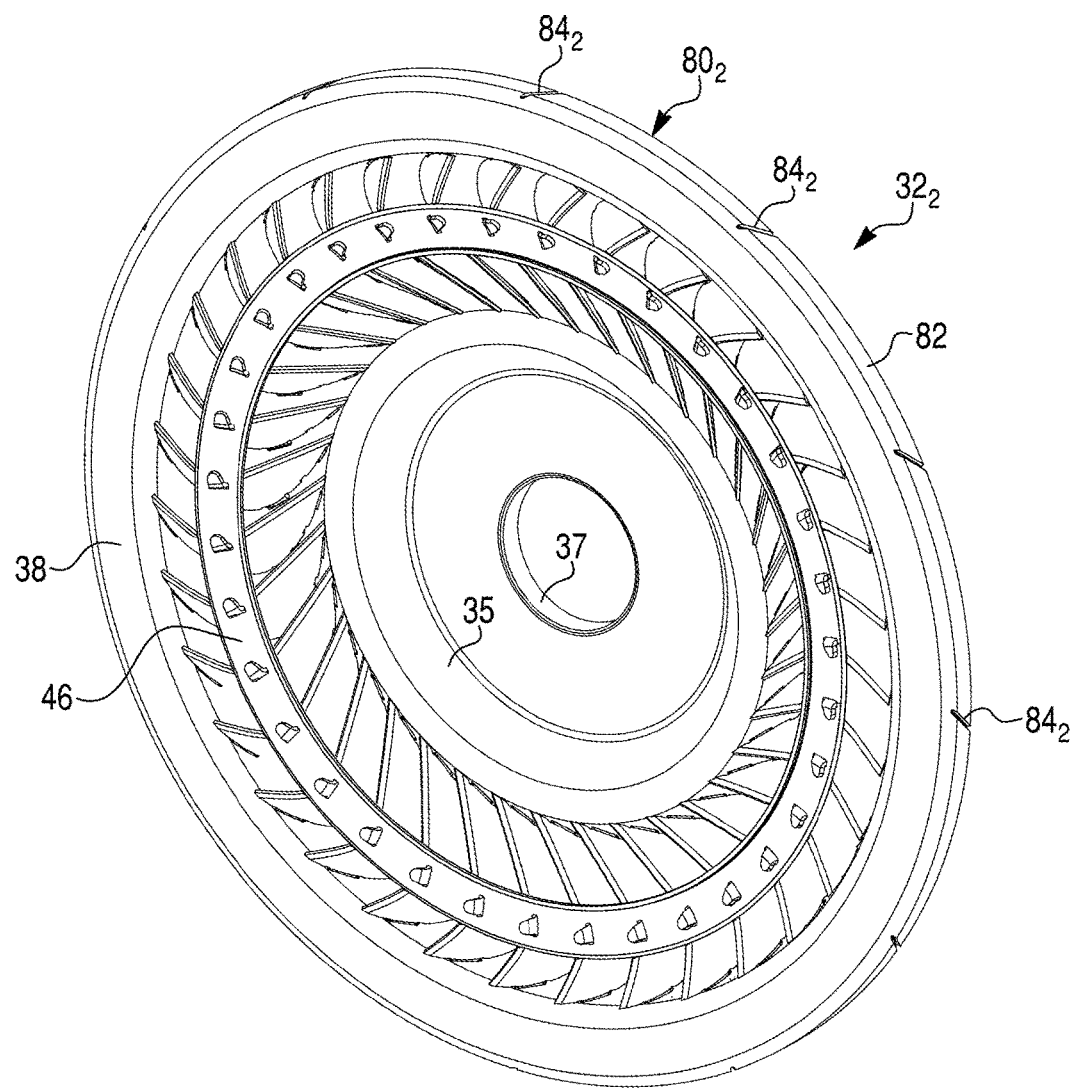
FIG. 8 is a perspective view of another alternative turbine-piston according to the first exemplary embodiment of the present invention.
Figure 9A:
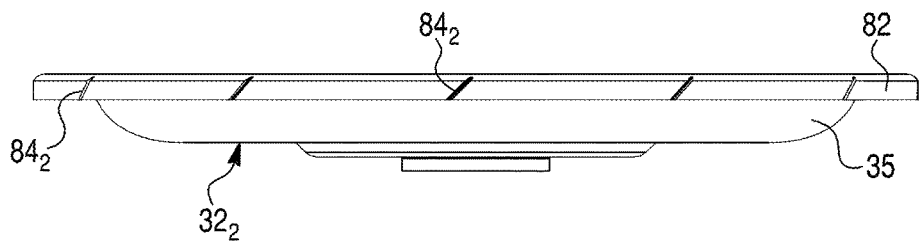
FIG. 9A is a top view of the turbine-piston of FIG. 8.
Figure 9B:
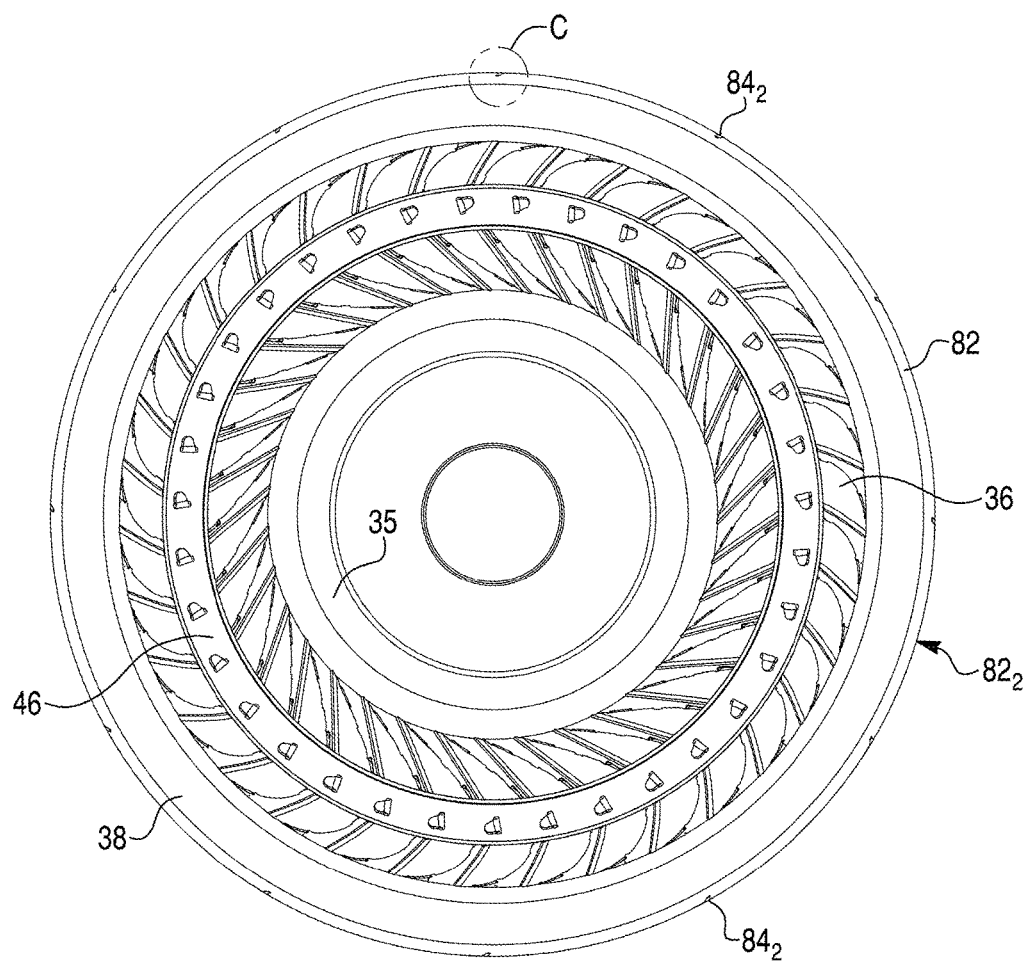
FIG. 9B is a side view of the turbine-piston of FIG. 8.

Another alternative turbine-piston $32_2$ of the first exemplary embodiment of the present invention includes a restriction element $80_2$ secured to or integrally formed as part of the turbine-piston $32_2$ for restricting fluid flow between the first and second chambers 52, 54. The turbine-piston $32_2$ according to the alternative exemplary embodiment of FIGS. 8-10 corresponds substantially to the turbine-piston $32_1$ of FIGS. 5-7, with only the restriction element $80_2$ differing. Those differences are explained in detail below.

The restriction element $80_2$ includes an annular external restrictor flange member 82 extending substantially axially from a distal end $35_3$ of the turbine-piston flange 38 of the turbine-piston $32_2$. The external restrictor flange member 82 includes one or more restriction passages, best shown in FIGS. 8, 9A and 10 as restriction grooves $84_2$ formed on a cylindrical outer peripheral surface 83 of the restrictor flange member 82. Each of the restriction grooves $84_2$ extends through the thickness of the external restrictor flange member 82 at an oblique angle α relative to the axial direction. Specifically, in reference to a direction that is axially outward from the torus chamber 52 towards the damper chamber 54 (i.e., from left to right in FIGS. 1 and 2), the restriction grooves $84_2$ extend against the direction of rotation of the turbine-piston $32_1$. Although shown circumferentially equidistant from one another, it should be understood that the restriction grooves $84_2$ may be spaced otherwise, including randomly relative to one another. The restriction grooves $84_2$ are provided to fluidly interconnect the first chamber (or torus chamber) 52 and the second (or damper) chamber 54. The restriction grooves $84_2$ of the restriction element $80_2$ have a calibrated cross-section to maintain at least a minimum of fluid flow between the torus chamber 52 and the damper chamber 54 to cool the torque converter 14.

Such an angular orientation of the restriction grooves $84_1$ and $84_2$ creates a pumping effect which improves, in a hydrodynamic transmission (or non-lockup) mode/non-hydrodynamic transmission (or lockup) mode, suction/non-suction of the fluid into or out of the torus chamber 52.

In the lockup mode, the first and second engagement surfaces $29_1$ and $39_2$ (or friction ring(s) 48 secured thereto) are pressed together such that the turbine-piston flange 38 of the turbine-piston 32 is frictionally non-rotatably coupled to the piston engagement portion 28 of the casing 12, thereby mechanically locking the turbine-piston 32 to the casing 12. When not in the lockup mode, the first and second engagement surfaces $29_1$ and $39_2$ are spaced from one another, such that the turbine-piston flange 38 is not frictionally non-rotatably coupled to the casing 12. In the non-lockup mode, normal operation of the torque converter 14 fluidly couples and decouples the impeller 30 to and from the turbine-piston 32.

The torsional vibration damper 16 is housed in the casing 12 axially between the turbine-piston 32 and the first sidewall 22 of the casing 12, as shown in FIG. 1. The torsional vibration damper 16 is connected to a drive (or input) member 56 (discussed below), and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1, the first and second damping members 60, 64 are configured as helical (or coil) springs having a principal axis oriented substantially circumferentially. Other elastic members may be selected to replace or supplement the springs.

The drive member 56 is fixedly connected to the turbine-piston shell 35 of the turbine-piston 32, such as by weld 55. The output side of the drive member 56 has a plurality of driving tabs 57 (FIG. 2) extending axially in the direction away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposite direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 of the damper assembly 16 is rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston 32 between its lockup and non-lockup positions. As discussed in greater detail below, when the turbine-piston 32 shifts axially due to a lockup event, the driving tabs 57 move axially relative to the driven tabs 59. Thus, the drive member 56 is both axially and circumferentially moveable relative to the intermediate member 58 of the damping assembly 16.

The radially inner portion of the intermediate member 58 forms or is connected to a first disk part 68 on a first side of the second damping members 64. The first disk part 68 is non-moveably secured to a second disk part 69 on the opposite side of the second damping members 64, such as by rivets 70 or welding. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is fixed to so as to be non-rotatably connected to the output hub 40. The non-rotatable connection between the driven member 62 and the output hub 40 may be established by splines or welding. Alternatively, the output hub 40 and driven member 62 may be integral with one another. A thrust bearing 76 is positioned between the output hub 40 and the first casing shell 18.

The damper assembly 16, in particular, the intermediate member 58, the driven member 62, and the damping members 60, 64 are not axially movable relative to one another or relative to the output hub 40. The axial movement between the drive member 56 and its driving tabs 57 relative to the driven tabs 59 allows the intermediate member 58, the driven member 62, and the damping members 60, 64 to remain fixed axially while the turbine-piston 32 and the drive member 56 move in the axial direction. In both the lockup and non-lockup modes, the drive member 56 is configured to rotationally drive the damper assembly 16 and the output hub 40.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. A pressure increase in the damper chamber 54 relative to the torus chamber 52 (or stated differently, a pressure decrease in the torus chamber 52 relative to the damper chamber 54) shifts the turbine-piston 32 axially in the direction of torque transmission, i.e., towards the output side of the casing 12, that is right to left in FIG. 1, into the lockup position. On the other hand, a pressure decrease in the damper chamber 54 relative to the torus chamber 52 (or stated differently a pressure increase in the torus chamber 52 relative to the damper chamber 54) shifts the turbine-piston shell 35 and the drive member 56 affixed thereto axially against the direction of torque transmission, i.e., towards the input side of the casing, that is left to right in FIG. 1, out of the lockup position. Pressure changes are created by control of the fluid, e.g., hydraulic fluid or oil, in the chambers 52 and 54.

In the lockup mode, the turbine-piston shell 35 is displaced axially towards the impeller 30 until the frictional ring 48 of the second engagement surface $39_2$ of the turbine-piston flange 38 (which moves axially with the turbine-piston shell 35) abuts against and is non-rotatably frictionally coupled to the first engagement surface $29_1$ of the casing 12. In the lockup mode, torque is transferred from the engine to the casing 12, then by way of the frictional engagement between surfaces $29_1$ and $39_2$ (or the frictional lining 48 thereof) to the drive member 36 welded to the turbine-piston shell 35, then serially to the damping assembly 16 and the output hub 40. Thereby, the piston engagement portion 28 of the casing 12 and the turbine-piston flange 38 of the turbine-piston 32 together create a lockup clutch that bypasses the hydrodynamic fluid coupling of the torque converter 14 and mechanically couples the driving and driven shafts. Notably, the friction ring 48 secured to the second engagement surface $39_2$ may have a plurality of circumferentially spaced grooves (not shown) extending generally radially so as to fluidly connect the torus chamber 52 and the damper chamber 54 with one another in the lockup mode for cooling friction surfaces of the lockup clutch 50 by the working fluid.

In the non-lockup mode, the turbine-piston 32 is displaced axially away from the impeller 30, axially moving the turbine-piston shell 35 and the turbine-piston flange 38 until the second engagement surface $39_2$ (or the frictional lining 48 thereof) is spaced from and no longer non-rotatably frictionally coupled to the first engagement surface $29_1$. Thus, torque transferred from the engine to the casing 12 in a hydrodynamic transmission mode does not bypass the torque converter 14 through the lockup clutch 50.

On the other hand, in the lockup mode, torque received by the locked up turbine-piston flange 38 from the casing 12 is transmitted through the turbine-piston shell 35 and the drive member 56 welded thereto at 55 to the torsional vibration damper 16, then to the output hub 40, which is connected to the driven shaft, such as by splines 42. As the turbine-piston 32 and the drive member 56 move axially into and out of lockup position as described above, the driving tabs 57 of the drive member 56 are axially displaced relative to the driven tabs 59 of the intermediate member 58. The relative axial movement between the driving tabs 57 and the driven tabs 59 allows the intermediate member 58, the driven member 62, and the damping members 60, 64 to remain fixed axially on the output hub 40 while the turbine-piston 32 and the drive member 56 move in the axial direction.

In operation, the lockup clutch 50 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be somewhat thicker than typical turbine shells that do not form or function as the lockup piston. Although not shown, a biasing member, such as a spring (e.g., a washer spring), may be included in the hydrokinetic torque coupling device 10 to axially urge the turbine-piston 32 into or out of lockup mode.

The turbine-piston 32 both forms the shell component of the turbine and the piston component of the lockup clutch, as described above. By consolidating two components that are normally separate from one another into a single component, space is saved in the torque hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment, including but not limited to the additional embodiments shown in FIGS. 11-28. In the interest of brevity, reference characters in FIGS. 11-28 that are discussed above in connection with FIGS. 1-4 are not further elaborated upon below, except to the extent necessary or useful to explain the additional embodiments of FIGS. 11-28. Modified components and parts are indicated by the addition of a hundred, two hundreds, etc. digit to the reference numerals of the components or parts.

Figure 11:
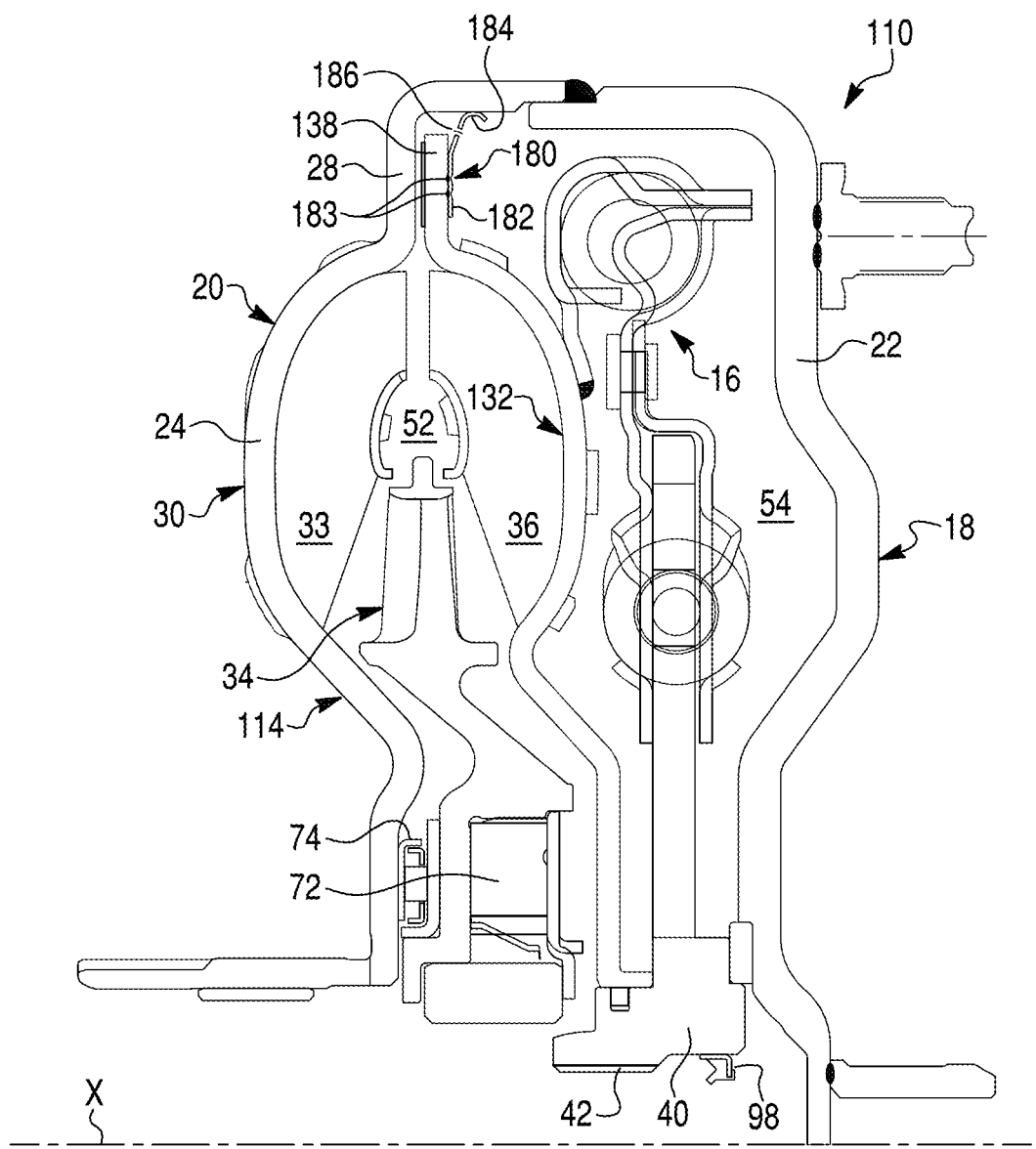
FIG. 11 is a fragmented half-view in axial section of a hydrokinetic torque coupling device in accordance with a second exemplary embodiment of the present invention.
Figure 12:
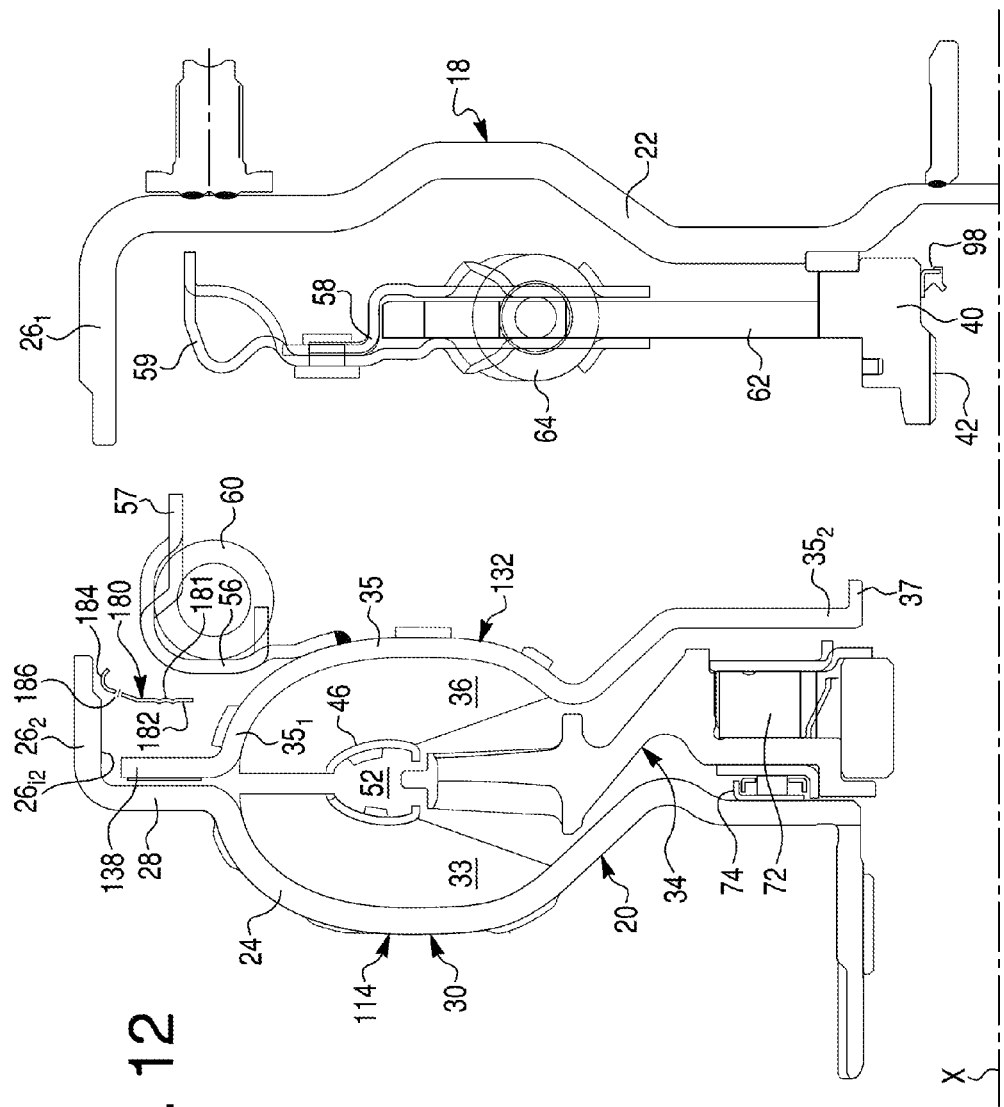
FIG. 12 is an exploded fragmentary cross-sectional view of the hydrokinetic torque coupling device of FIG. 11.
Figure 13:
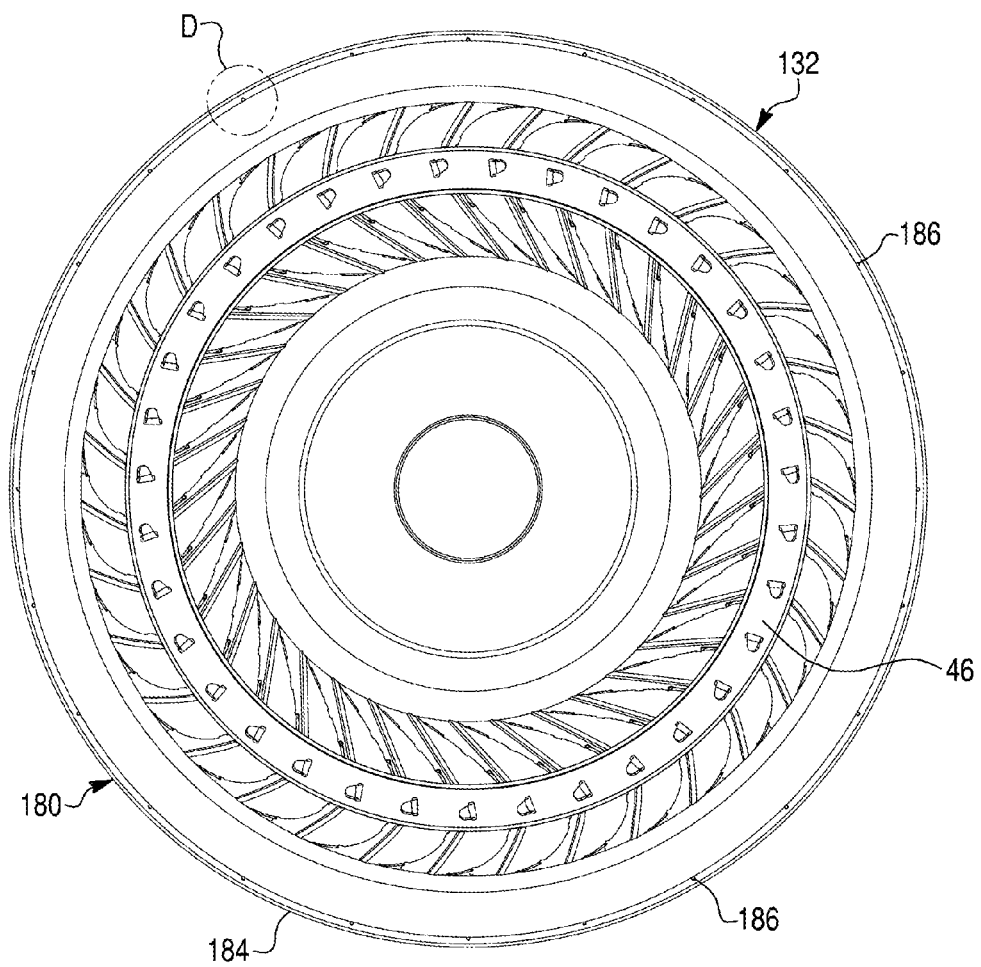
FIG. 13 is a front view of a turbine-piston of the hydrokinetic torque coupling device of FIG. 1.
Figure 14:
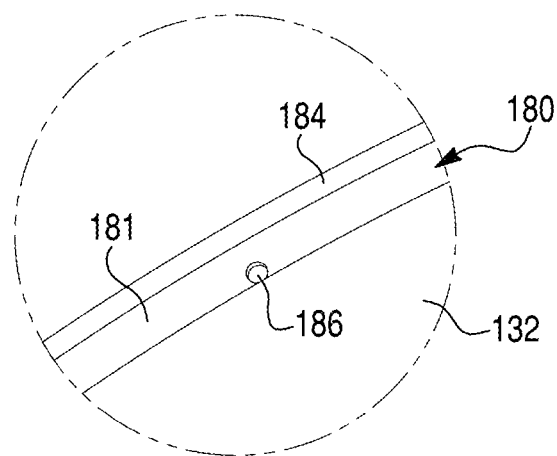
FIG. 14 is an enlarged view of a fragment of the turbine-piston shown in the circle "D" in FIG. 13.
Figure 15:
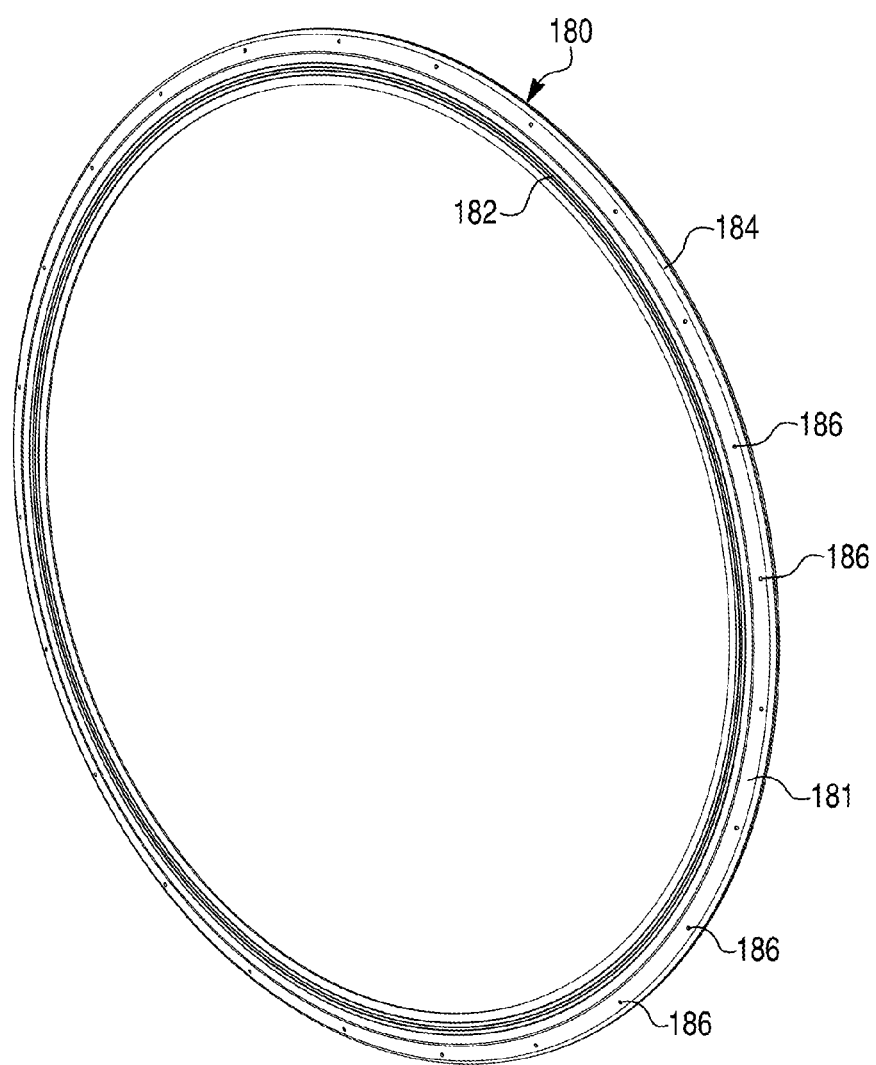
FIG. 15 is a perspective view of a restriction element of the turbine-piston in accordance with the second exemplary embodiment of the present invention.

A hydrokinetic torque coupling device 110 of a second embodiment illustrated in FIGS. 11-15 includes a sealed casing 12, a torque converter 114, and a torsional vibration damper 16. The torque converter 114 includes an impeller 30, a turbine-piston 132, and a stator 34 interposed axially between the impeller 30 and the turbine-piston 132. The turbine-piston 132 is a consolidation or incorporation of a turbine with a lockup clutch piston. The turbine-piston 132 includes a turbine-piston shell 35, a core ring 46, and a plurality of turbine blades 36 fixedly attached, such as by brazing, to the turbine-piston shell 35 and the core ring 46. The turbine-piston 132 further includes a substantially annular, planar (i.e., flat) turbine-piston flange (or turbine-piston wall) 138. The turbine-piston flange 138 is distal to the rotational axis X relative to the above-discussed proximal flange 37. The turbine-piston flange 138 is a radial extension of the turbine-piston shell 35 and, as illustrated in FIG. 11, is disposed radially outside of the turbine blades 36. The turbine-piston flange 38 and the turbine-piston shell 35 are embodied as integral with one another, e.g., made of a single or unitary component, but may be separate components connected together. The turbine-piston flange 138 extends from a radially outer peripheral end $35_1$ of the torus portion of the turbine-piston shell 35 radially outward to terminate at an end in spaced relationship to the radially inner peripheral surface 26i of the annular outer wall portion 26 of the casing 12. Moreover, the turbine-piston flange 138 extends sufficiently outward radially to axially overlap with the piston engagement portion 28 of the second casing shell 20.

In the hydrokinetic torque coupling device 110 of the second embodiment illustrated in FIGS. 11-15, a restriction element 180 replaces the restriction element 80 of FIGS. 1-3. According to the exemplary embodiment, the restriction element 180 is made as a single-piece annular washer 181 made from a material having a very low friction coefficient. The annular washer 181 is coaxial with the rotational axis X, i.e., centered in the impeller shell 20. The restriction element 180 has a radially inner end portion 182 non-moveably attached to the turbine-piston flange 138 of the turbine-piston 132, such as by laser welding at 183, and a flanged radially outer end portion 184 axially slidably engaging the radially inner peripheral surface 26i of the second outer wall 262 of the casing 12. This sliding engagement allows the restriction element 180 to rotate relative to the casing 12 when the device 110 is in non-lockup mode.

The annular washer 181 of the restriction element 180 includes one or more passages, embodied in FIGS. 11-15 as calibrated holes 186, provided to maintain at least a minimum of fluid flow from the torus chamber 52 to the damper chamber 154 to cool down the torque converter 114. As best shown in FIG. 11, the calibrated holes 186 are disposed radially outside of the turbine-piston flange 138. Moreover, the calibrated holes 186 are embodied as circumferentially and equidistantly spaced apart from one another.

Figure 16:
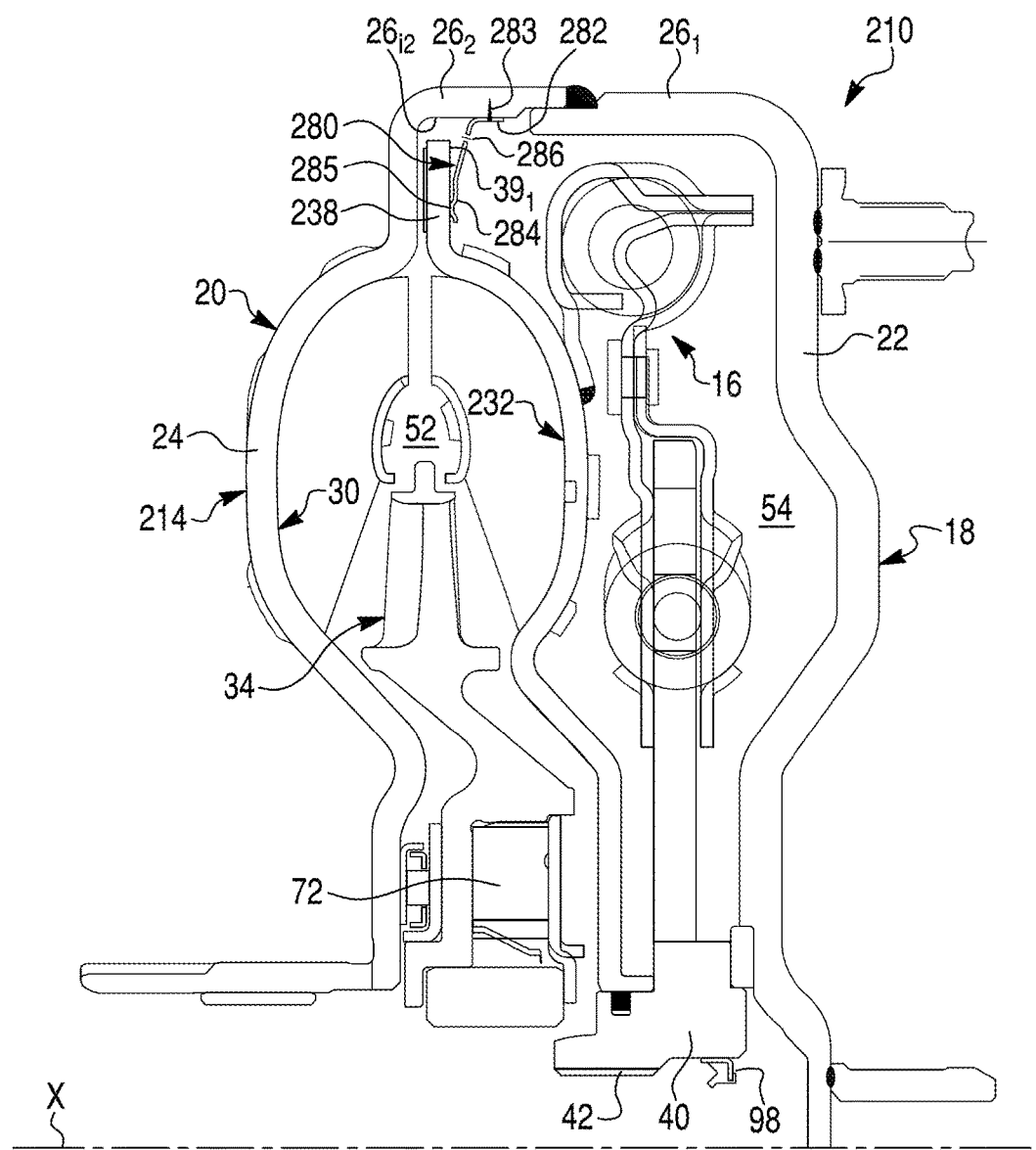
FIG. 16 is a fragmented half-view in axial section of a hydrokinetic torque coupling device in accordance with a third exemplary embodiment of the present invention.
Figure 17:
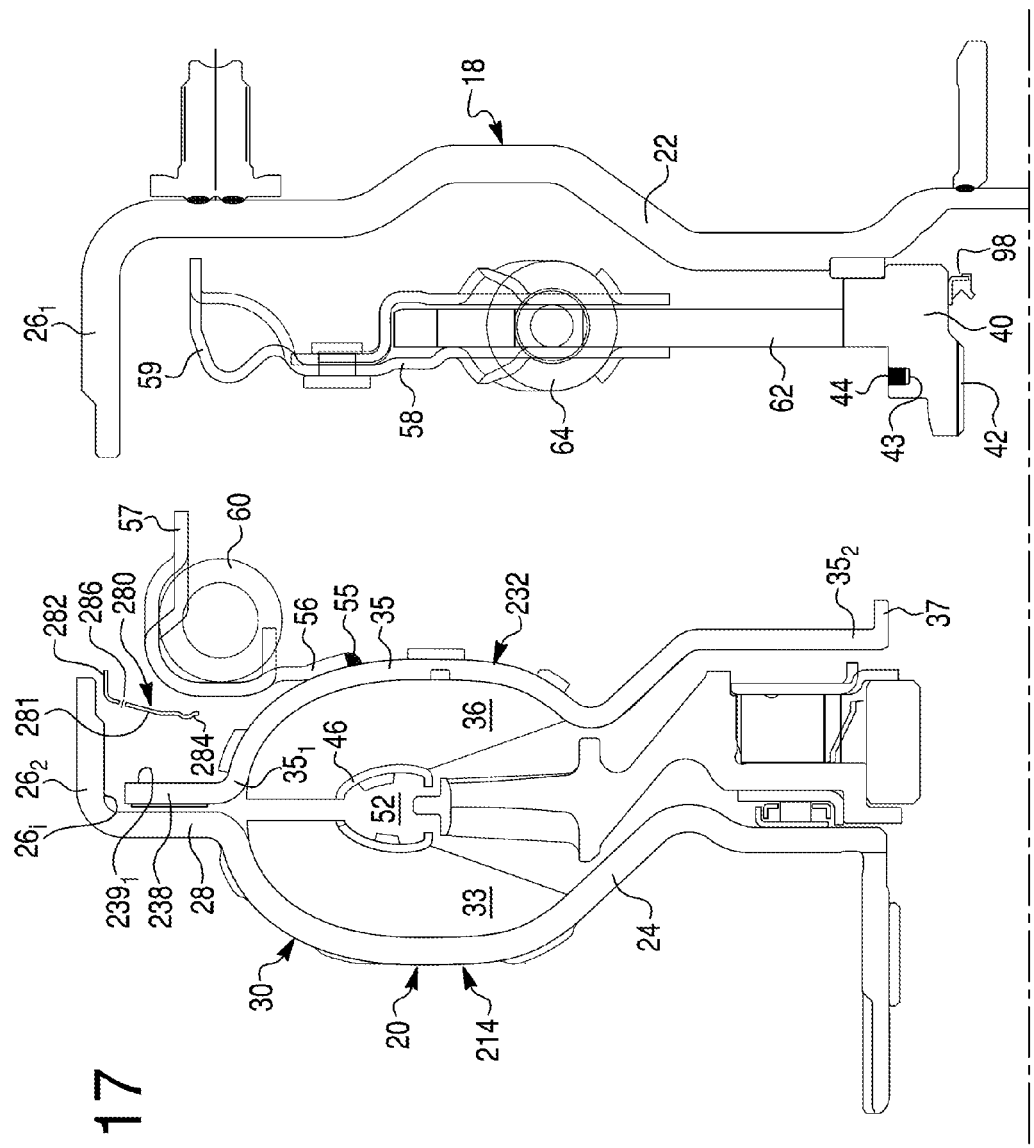
FIG. 17 is an exploded fragmentary cross-sectional view of the hydrokinetic torque coupling device of FIG. 16.
Figure 18:
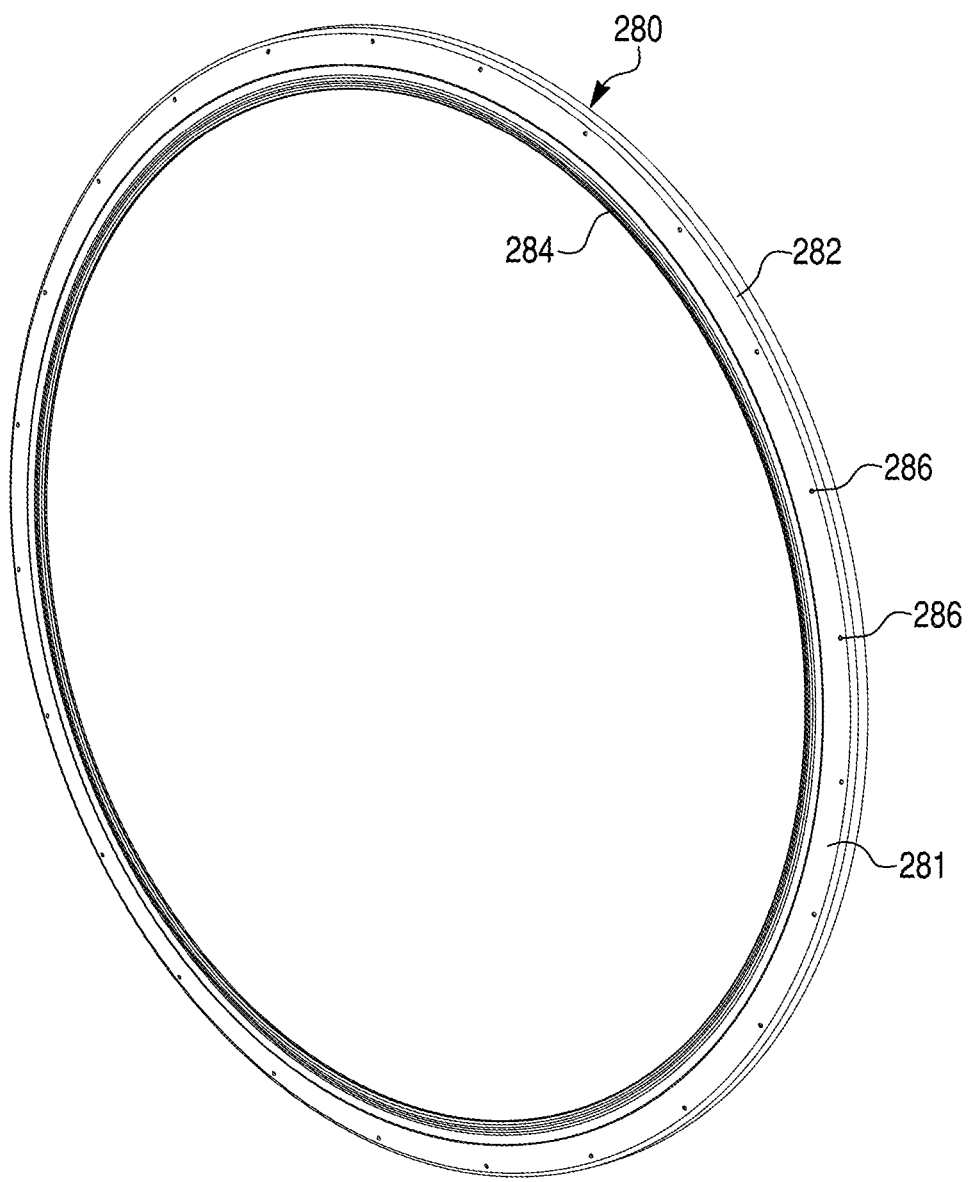
FIG. 18 is a perspective view of a restriction element in accordance with the third exemplary embodiment of the present invention.

A hydrokinetic torque coupling device 210 of a third embodiment illustrated in FIGS. 16-18 includes a sealed casing 12, a torque converter 214, and a torsional vibration damper 16. The torque converter 214 includes an impeller 30, a turbine-piston 232, and a stator 34 interposed axially between the impeller 30 and the turbine-piston 232. The turbine-piston 232 is a consolidation or incorporation of a turbine with a lockup clutch piston. The turbine-piston 232 includes a turbine-piston shell 35, a core ring 46, and a plurality of turbine blades 36 fixedly attached, such as by brazing, to the turbine-piston shell 35 and the core ring 46. The turbine-piston 232 further includes a substantially annular, planar turbine-piston flange 238. The turbine-piston flange 238 is distal to the rotational axis X relative to the above-discussed proximal flange 37. The turbine-piston flange 238 is a radial extension of the turbine-piston shell 35 and, as illustrated in FIGS. 16 and 17, is disposed radially outside of the turbine blades 36. The turbine-piston flange 238 and the turbine-piston shell 35 are embodied as integral with one another, e.g., made of a single or unitary component, but may be separate components connected together. The turbine-piston flange 238 extends from a radially outer peripheral end 351 of the torus portion of the turbine-piston shell 35 radially outward to terminate at an end in spaced relationship to the inner peripheral surface 26i of the annular outer wall portion 26 of the casing 12. Moreover, the turbine-piston flange 238 extends sufficiently outward radially to axially overlap with the piston engagement portion 28 of the second casing shell 20.

In the hydrokinetic torque coupling device 210 of the third embodiment illustrated in FIGS. 16-18, a restriction element 280 replaces the restriction element 180 of FIGS. 11-15. The restriction element 280 is embodied as an annular, flexible washer 281 that is coaxial with the rotational axis X. The washer includes a flanged radially outer end portion 282 non-moveably attached to the radially inner peripheral surface 26i of the second outer wall $26_2$ of the casing 12, such as by laser welding at 283 (FIG. 16). In other words, the washer 281 is axially fixed by welding to the second casing shell 20 of the casing 12. The restriction element 280 also includes an opposite flanged radially inner end portion 284 circumferentially slidably engaging a first surface $239_1$ of the turbine-piston flange 238 of the turbine-piston 232 so that the restriction element 280 is rotatable relative to the turbine-piston 232 when the device 210 is in the non-lockup (hydrodynamic transmission) mode.

The annular washer 281 of the restriction element 280 includes one or more passages embodied in FIGS. 16-18 as calibrated holes 286 provided between the flanged ends 282, 284. The passages, or more specifically the embodied holes 286, maintain at least a minimum of fluid flow from the torus chamber 52 to the damper chamber 54 to cool down the torque converter 214. The calibrated holes 286 are illustrated circumferentially and equidistantly spaced apart from one another, although the holes 286 may be otherwise arranged. As best shown in FIG. 16, the calibrated holes 286 are disposed radially outside of the turbine-piston flange 238. The restriction element 280 limits the displacement of the turbine-piston 232 in the direction away from the impeller 30, thus maintaining a pre-determined distance between the piston engagement portion 28 of the impeller 30 and the turbine-piston flange 238 of the turbine-piston 232 in the non-lockup mode.

Figure 19:
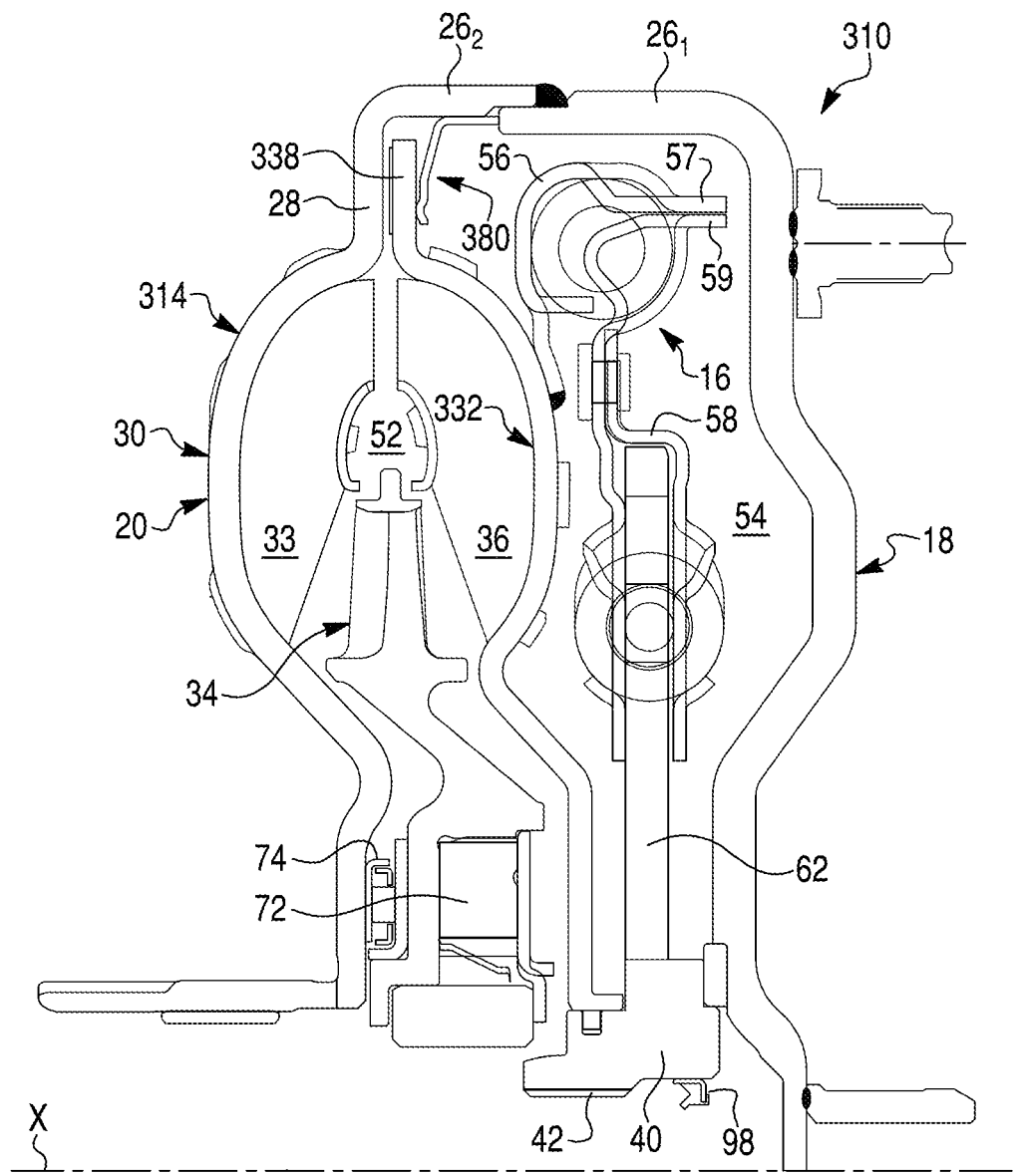
FIG. 19 is a fragmented half-view in axial section of a hydrokinetic torque coupling device in accordance with a fourth exemplary embodiment of the present invention.
Figure 20:
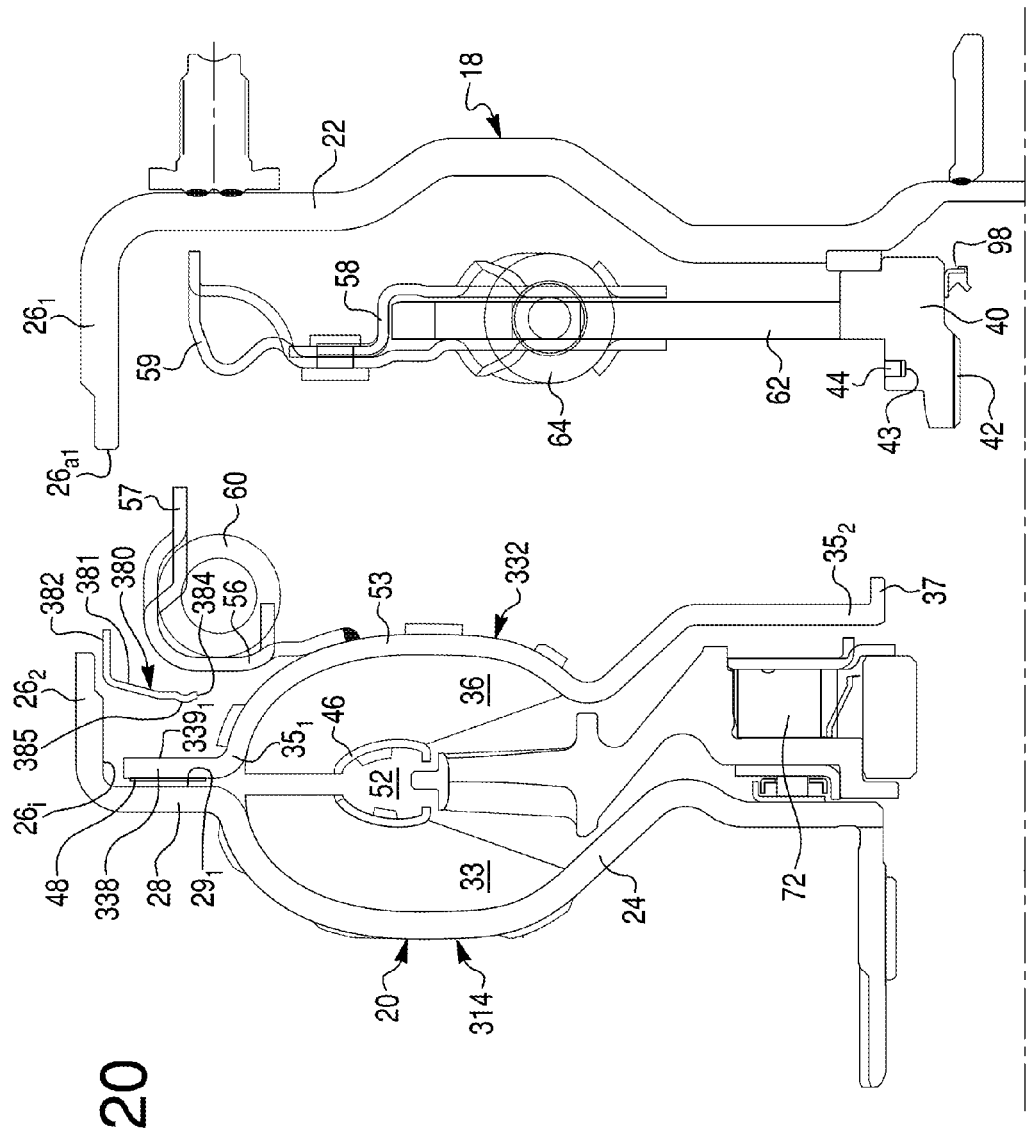
FIG. 20 is an exploded fragmentary cross-sectional view of the hydrokinetic torque coupling device of FIG. 19.

A hydrokinetic torque coupling device 310 of a fourth embodiment illustrated in FIGS. 19-22 includes a sealed casing 12, a torque converter 314, and a torsional vibration damper 16. The torque converter 314 includes an impeller 30, a turbine-piston 332, and a stator 34 interposed axially between the impeller 30 and the turbine-piston 332. The turbine-piston 332 includes a turbine-piston shell 35, a core ring 46, and a plurality of turbine blades 36 fixedly attached, such as by brazing, to the turbine-piston shell 35 and the core ring 46. The turbine-piston 332 further includes a substantially annular, planar turbine-piston flange 338. The turbine-piston flange 338 is distal to the rotational axis X relative to the above-discussed proximal flange 37. The turbine-piston flange 338 is a radial extension of the turbine-piston shell 35 and, as illustrated in FIGS. 19 and 20, is disposed radially outside of the turbine blades 36. The turbine-piston flange 338 and the turbine-piston shell 35 are embodied as integral with one another, e.g., made of a single or unitary component, but alternatively may be separate components connected together. The turbine-piston flange 338 extends from a radially outer peripheral end $35_1$ of the torus portion of the turbine-piston shell 35 radially outward to terminate at an end in spaced relationship to the radially inner peripheral surface 26i of the annular outer wall portion 26 of the casing 12. Moreover, the turbine-piston flange 338 extends sufficiently outward radially to axially overlap with the piston engagement portion 28 of the second casing shell 20.

In the hydrokinetic torque coupling device 310 of the fourth embodiment illustrated in FIGS. 19-22, a restriction element 380 replaces the restriction element 280 of FIGS. 16-18. The restriction element 380 is embodied as an annular, flexible washer 381 having a flanged radially outer end portion 382 engaging the radially inner peripheral surface 26i of the second outer wall $26_2$ of the casing 12, and a radially inner end portion 384 slidably engaging a first surface $339_1$ of the turbine-piston flange 338 of the turbine-piston 332. The sliding engagement permits the restriction element 380 to rotate relative to the turbine-piston flange 338 when the device 310 is in non-lockup mode. The annular washer 381 is coaxial with the rotational axis X, i.e., centered in the impeller shell 20. Moreover, the radially outer end portion 382 of the annular washer 381 axially engages (axially abuts) an axial peripheral surface 26a, of the first outer wall $26_1$ of the casing 12 in order to limit the displacement of the turbine-piston 332 in the direction away from the impeller 30. The annular washer 381 also maintains a pre-determined clearance between the impeller 30 and the turbine-piston 332.

Figure 21:
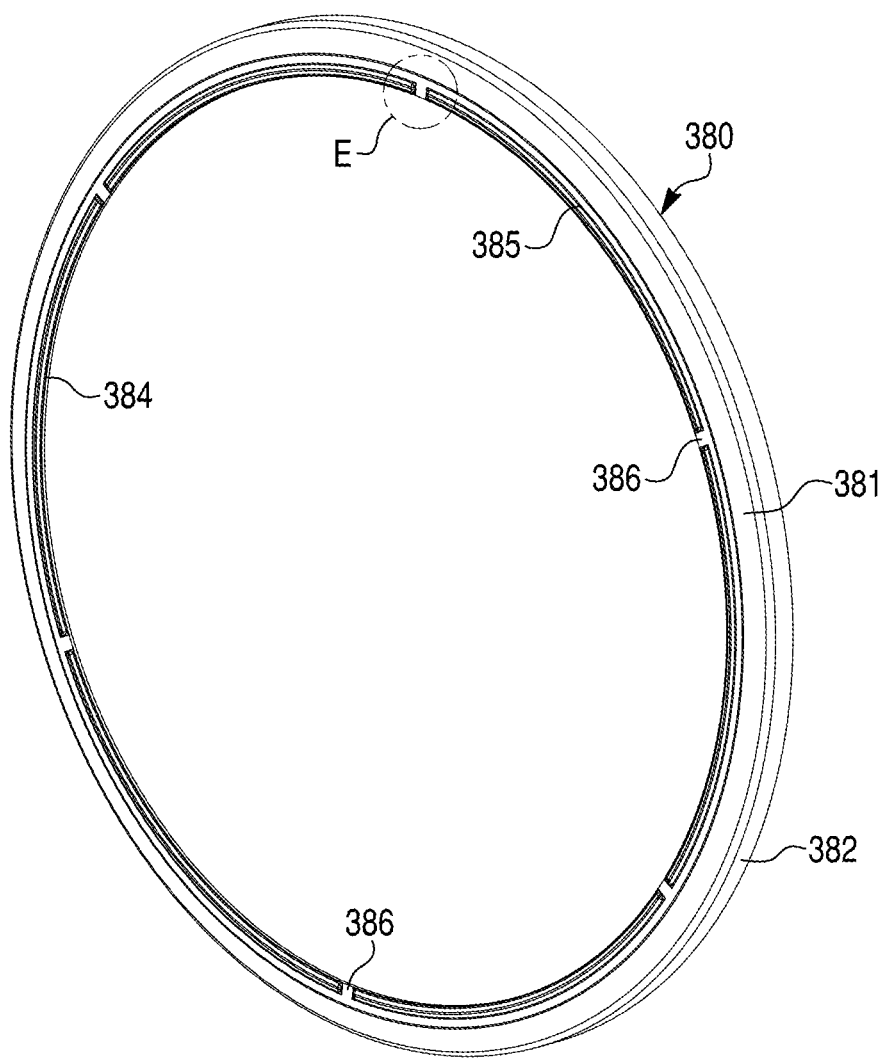
FIG. 21 is a perspective view of a restriction element in accordance with the fourth exemplary embodiment of the present invention.
Figure 22:
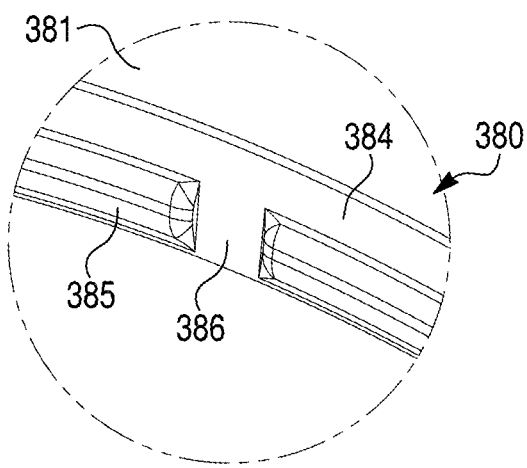
FIG. 22 is an enlarged view of a fragment of the restriction element shown in the circle "E" of FIG. 21.

The annular washer 381 includes at least one substantially annular fulcrum 385 at the radially inner end portion 384 of the annular washer 381 to localize the contact between the back of the first surface 3391 of the turbine-piston flange 338 of the turbine-piston 332 and the annular washer 381. As best shown in FIGS. 21 and 22, the annular fulcrum 385 has one or more discontinuities therein forming one or more passages embodied as radial grooves 386 extending through the annular fulcrum 385. The passages, such as the embodied radial grooves 386, are circumferentially and equidistantly spaced apart, and are provided to ensure the necessary flow so as to maintain a minimum of fluid flow to cool down the torque converter 314.

Figure 24:
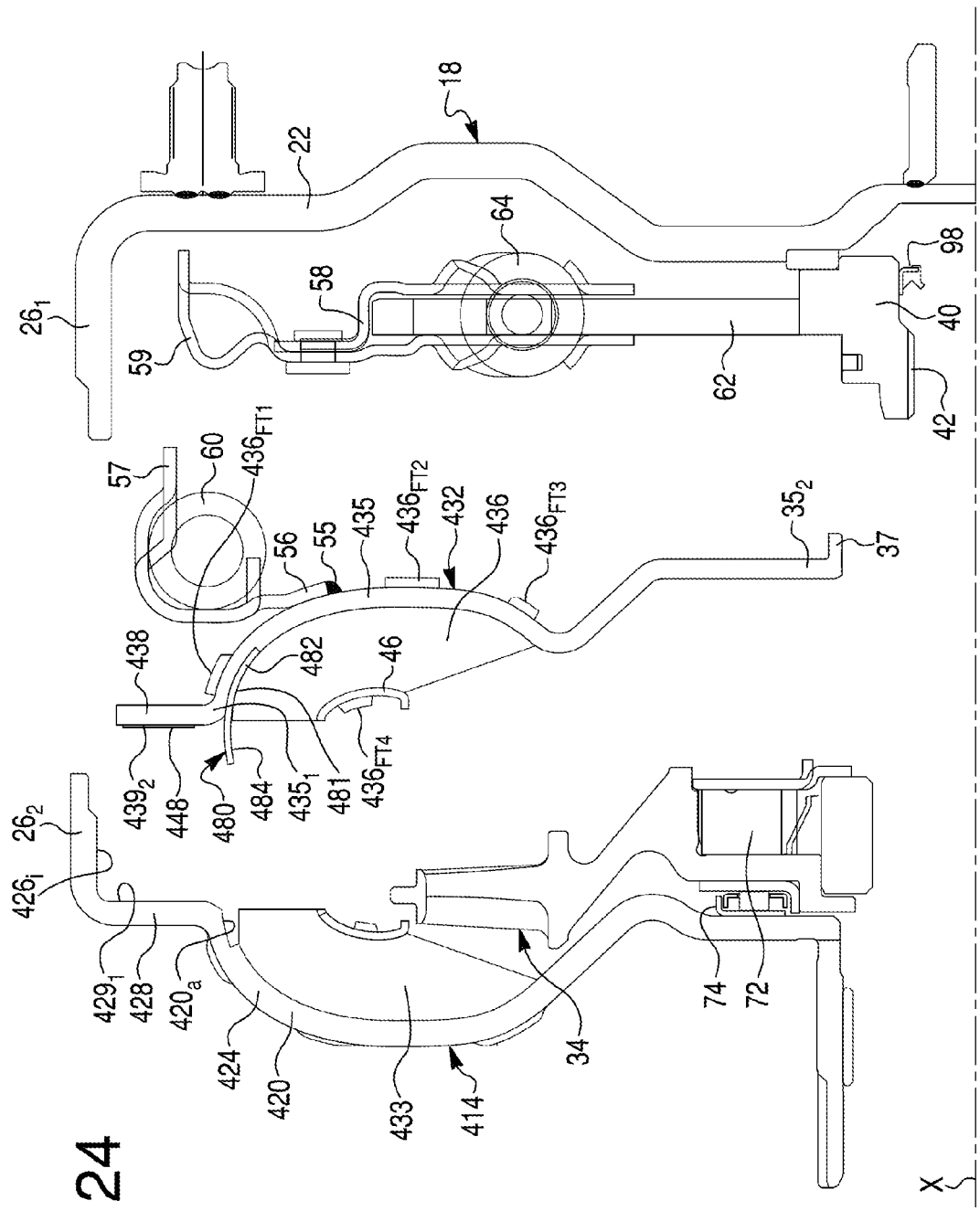
FIG. 24 is an exploded fragmentary cross-sectional view of the hydrokinetic torque coupling device of FIG. 23.

A hydrokinetic torque coupling device 410 of a fifth embodiment illustrated in FIGS. 23-28 includes a sealed casing 412, a torque converter 414, and a torsional vibration damper 16. The torque converter 414 includes an impeller 430, a turbine-piston 432, and a stator 34 interposed axially between the impeller 430 and the turbine-piston 432. The turbine-piston 432 includes a turbine-piston shell 435, a core ring 46, and a plurality of turbine blades 436 fixedly attached, such as by brazing, to the turbine-piston shell 435. The turbine-piston 432 further includes a substantially annular, planar turbine-piston flange 438. The turbine-piston flange 438 is distal to the rotational axis X relative to a proximal flange 37. The turbine-piston flange 438 is a radial extension of the turbine-piston shell 435 and, as illustrated in FIGS. 23 and 24, is disposed radially outside of the turbine blades 436. The turbine-piston flange 438 and the turbine-piston shell 435 are embodied as integral with one another, e.g., made of a single or unitary component, but alternatively may be separate components connected together. The turbine-piston flange 438 extends from a radially outer peripheral end $35_1$ of the torus portion of the turbine-piston shell 435 radially outward to terminate at an end in spaced relationship to the radially inner peripheral surface 426i of an annular outer wall portion 426 of the casing 412. Moreover, the turbine-piston flange 438 extends sufficiently outward radially to axially overlap with a piston engagement portion 428 of the second casing shell 420.

In the hydrokinetic torque coupling device 410 of the fifth embodiment illustrated in FIGS. 23-28, a restriction element 480 replaces the restriction element 380 of FIGS. 19-22. The restriction element 480 is embodied as an annular, axially curved sealing ring (or strip) 481 having a proximal end portion 482 non-moveably secured to the turbine-piston shell 435 at the position adjacent to a radially outer peripheral end $435_1$ of the torus portion of the turbine-piston shell 435, and a distal end portion 484 axially extending from the turbine-piston shell 435 towards the impeller 430. As best shown in FIG. 28, the restriction element 480 includes a plurality of slots 486 extending through the sealing ring 481.

As best shown in FIGS. 23-24, the proximal end portion 482 of the sealing ring 481 is disposed between the turbine-piston shell 435 and the turbine blades 436. The distal end portion 484 of the sealing ring 481 is disposed in an annular groove 420a, which as best shown in FIG. 24, is on an inner peripheral surface of the impeller shell 420. The annular groove 420a in the impeller shell 420 is curved so that the curved sealing ring 481 is moveable into and out of the annular groove 420a as the turbine-piston 432 moved into and out of lockup mode.

The turbine blades 436 of the turbine-piston 432 are fixedly secured to the turbine-piston shell 435 and the core ring 46 of the turbine-piston 432 as follows. Referring to FIG. 24, each of the turbine blades 436 includes one or more, such as three, front mounting tabs $436_{FT1}$ $436_{FT2}$, and $436_{FT3}$ formed integrally therewith on a radially outer surface of the turbine blades 436. The front mounting tabs engage with a plurality of outer slots $435_{S1}$ angled in the circumferential direction and circumferentially spaced from each other, a plurality of middle slots $435_{S2}$ angled in the circumferential direction and circumferentially spaced from each other, and a plurality of inner slots $435_{S3}$ angled in the circumferential direction and circumferentially spaced from each other, respectively, as shown in FIG. 27. Locations of the slots $435_{S1}$, $435_{S2}$ and $435_{S3}$ on the turbine-piston shell 435 are complementary to the locations of the front mounting tabs $436_{FT1}$, $436_{FT2}$, and $436_{FT3}$ of the turbine blades 436.

As further illustrated in FIG. 27, the outer slots $435_{S1}$ of the turbine-piston shell 435 are complementary to the slots 486 of the sealing ring 481. Accordingly, the first front mounting tabs $436_{FT1}$ of the turbine blades 436 extend through both corresponding slots 486 of the sealing ring 481 and corresponding outer slots $435_{S1}$ of the turbine-piston shell 435 and are fixed to the turbine-piston shell 435. The second front mounting tabs $436_{FT2}$ of the turbine blades 436 extend through the middle slots $435_{S2}$ of the turbine-piston shell 435 and are fixed to the turbine-piston shell 435. The third front mounting tabs $436_{FT3}$ of the turbine blades 436 extend through the inner slots $435_{S3}$ of the turbine-piston shell 435 and are fixed to the turbine-piston shell 435.

Similarly, the core ring 46 of the turbine-piston 432 is provided with a plurality of slots (not shown). Fourth mounting tabs $436_{FT4}$ (FIG. 24) extend through the corresponding slots of the core ring 46.

The restriction element 480 fluidly isolates the torus chamber 52 from the damper chamber 54 so as to create a significant pressure drop of the fluid flow going through the restriction element 480 from the torus chamber 52 to the damper chamber 54. The pressure drop created by the restriction element 480 urges the turbine-piston 432 away from the impeller 430, out of lockup mode. Moreover, the distal end portion 484 of the sealing ring 481 is radially spaced from the turbine-piston shell 435 so as to define a pre-determined clearance between the impeller 430 and the turbine-piston 432 to maintain at least a minimum of fluid flow between the torus chamber 52 and the damper chamber 54 to cool down the torque converter 414.

The features of the above-described embodiments are substitutable in numerous combinations.

An exemplary method for assembling the hydrokinetic torque coupling device 10 of the first exemplary embodiment of FIGS. 1-4 will now be explained. While the methods for assembling the hydrokinetic torque coupling devices 10, 110, 210, 310, 410 may be practiced by sequentially performing the steps as set forth below, it should be understood that the methods may involve performing the steps in different sequences. It should be understood that this exemplary method may be practiced in connection with the other embodiments described herein. This exemplary method is not the exclusive method for assembling the hydrokinetic torque coupling devices described herein.

The impeller 30, the turbine-piston 32, the stator 34, and the damper 16 may each be preassembled. The turbine-piston 32 includes, as noted above, the turbine-piston shell 35 and the turbine blades 36 attached to the turbine-piston shell 35. The turbine-piston 32 is formed with or is machined to include the annular external restrictor flange member 82 extending substantially axially from the distal end $35_3$ of the turbine-piston flange 38 of the turbine-piston 32. The external restrictor flange member 82 is formed with or machined to include one or more axial grooves 84 on the cylindrical outer peripheral surface 83 thereof.

The impeller 30, the stator 34, and the turbine-piston 32 subassemblies are assembled together so that the second engagement surface $39_2$ of the turbine-piston flange 38 of the turbine-piston 32 faces the first engagement surface $29_1$ of the second sidewall 24 of the impeller shell 20 of the casing 12. The drive member 56, which may be for example stamped from metal, is secured, such as by welding at the weld 55, to the turbine-piston shell 35. The damper assembly 16 is then added. The cylindrical flange 37 of the turbine-piston 32 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the second casing shell 20, as best shown in FIG. 1.

An exemplary method for assembling the hydrokinetic torque coupling device 110 according to the second exemplary embodiment of FIGS. 11-15 is as follows. The radially inner end portion 182 of the annular washer 181 of the restriction element 180 is non-moveably attached to the turbine-piston flange 138 of the turbine-piston 132 by laser welding at the weld 183, preferably prior to welding the drive member 56 to the piston-turbine shell 35. The impeller 30, the stator 34, and the turbine-piston 132 subassemblies are assembled together so that the second engagement surface $39_2$ of the turbine-piston flange 138 of the turbine-piston 132 faces the first engagement surface $29_1$ of the second sidewall 24 of the second casing shell 20 of the casing 12. The radially outer end portion 184 of the annular washer 181 axially slidably engages the radially inner peripheral surface 26i of the second outer wall $26_2$ of the casing 12. The drive member 56 is secured, such as by welding at the weld 55, to the turbine-piston shell 35. The damper assembly 16 is then added. The cylindrical flange 37 of the turbine-piston 132 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the second casing shell 20, as best shown in FIG. 11.

An exemplary method for assembling the hydrokinetic torque coupling device 210 of the third exemplary embodiment of FIGS. 16-18 is as follows. The radially outer end portion 282 of the annular washer 281 of the restriction element 280 is non-moveably attached to the radially inner peripheral surface 26i of the second outer wall $26_2$ of the casing 12 by laser welding at 283. Thee impeller 30, the stator 34, and the turbine-piston 232 subassemblies are assembled together so that the second engagement surface $39_2$ of the turbine-piston flange 38 of the turbine-piston 232 faces the first engagement surface $29_1$ of the second sidewall 24 of the second casing shell 20 of the casing 12. The radially inner end portion 284 of the annular washer 281 axially slidably engages the first surface $39_1$ of the turbine-piston flange 38 of the turbine-piston 232. The drive member 56 is secured, such as by welding at the weld 55, to the turbine-piston shell 35. The damper assembly 16 is added. The cylindrical flange 37 of the turbine-piston 232 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the second casing shell 20, as best shown in FIG. 16.

An exemplary method for assembling the hydrokinetic torque coupling device 310 of the fourth exemplary embodiment of FIGS. 19-22 is as follows. The impeller 30, the stator 34, and the turbine-piston 332 subassemblies are assembled together so that the second engagement surface $39_2$ of the turbine-piston flange 338 of the turbine-piston 332 faces the first engagement surface $29_1$ of the second sidewall 24 of the second casing shell 20 of the casing 12. The restriction element 380 is mounted to the second casing shell 20 of the casing 12 so that the radially outer end portion 382 of the annular washer 381 of the restriction element 380 frictionally engages the radially inner peripheral surface 26i of the second outer wall $26_2$ of the second casing shell 20. The radially inner end portion 384 of the annular washer 381 axially slidably engages the first surface $39_1$ of the turbine-piston flange 338 of the turbine-piston 332. The drive member 56 is secured, such as by welding at the weld 55, to the turbine-piston shell 35. The damper assembly 16 is added. The cylindrical flange 37 of the turbine-piston 332 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the second casing shell 20, as best shown in FIG. 19.

An exemplary method for assembling the hydrokinetic torque coupling device 410 of the fifth exemplary embodiment of FIGS. 23-28 is as follows. The turbine-piston 432 is assembled so that the proximal end portion 482 of the sealing ring 481 of the restriction element 480 is non-moveably secured to the turbine-piston shell 435. Then, the impeller 430, the stator 34, and the turbine-piston 432 subassemblies are assembled together so that the distal end portion 484 of the sealing ring 481 is disposed in an annular groove 420a in the inner peripheral surface of an impeller shell 420, and so that the second engagement surface $39_2$ of the turbine-piston flange 438 of the turbine-piston 132 faces the first engagement surface $429_1$ of the second sidewall 424 of the impeller shell 420 of the casing 412. The drive member 56 is secured, such as by welding at the weld 55, to the turbine-piston shell 435. The damper assembly 16 is then added. The cylindrical flange 437 of the turbine-piston 432 is mounted to slidingly engage the output hub 40 (splined with the driven shaft at 42) with the seal 44 therebetween. The driving tabs 57 are engaged with the damper assembly 16 as described above. Then, the first casing shell 18 is non-moveably and sealingly secured, such as by welding at 19, to the impeller shell 420, as best shown in FIG. 23.

The torque converters and hydrodynamic torque coupling devices described herein may incorporate different damper assemblies. For example, FIG. 29 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 29. The diagram of FIG. 29 generally corresponds to the arrangement of the embodiments shown in FIGS. 1, 11, 16, 19 and 23.

FIG. 30 shows an alternative damper assembly 116 similar to that of FIG. 29, but in which the damper assembly 116 is modified to include only one set of circumferentially extending elastic damping members 60.

A damper assembly 216 shown in FIG. 31 is similar to that of FIG. 29, but further includes a centrifugal pendulum oscillator 96 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 58 and may be arranged on both sides of the intermediate member 58.

A damper assembly 316 shown in FIG. 32 is similar to that of FIG. 29, but further includes a spring mass system 99 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
a casing rotatable about a rotational axis and having an interior volume, the casing comprising a casing shell and an impeller shell disposed axially opposite to and fixedly connected to the casing shell;
an impeller coaxially aligned with the rotational axis and comprising the impeller shell, the impeller shell comprising a piston engagement portion integral with the impeller shell and having a first engagement surface;
a turbine-piston coaxially aligned with and hydrodynamically drivable by the impeller, the turbine-piston comprising a turbine-piston shell, a turbine-piston flange integral with the turbine-piston shell, the turbine-piston shell partitioning the interior volume of the casing into a first chamber between the impeller shell and the turbine-piston shell and a second chamber between the turbine-piston shell and the casing shell, the turbine-piston flange having a second engagement surface facing the first engagement surface, the turbine-piston flange with the turbine-piston shell movable axially toward and away from the first engagement surface to position the hydrokinetic torque coupling device into and out of a lockup mode in which the turbine-piston is mechanically locked with the piston engagement portion so as to be non-rotatable relative to the casing; and
a restriction element configured to restrict fluid flow and create a pressure drop between the first and second chambers when the hydrokinetic torque coupling device is out of the lockup mode.

2. The hydrokinetic torque coupling device of claim 1, wherein the turbine-piston shell and the turbine-piston flange are axially movable towards an output side of the hydrokinetic torque coupling device in order to frictionally couple the first and second engagement surfaces and position the turbine-piston in the lockup mode, and wherein the turbine-piston shell and the turbine-piston flange are axially movable towards an input side of the hydrokinetic torque coupling device so that the first and second engagement surfaces are not frictionally coupled and the turbine-piston is out of the lockup mode.

3. The hydrokinetic torque coupling device of claim 1, further comprising:
an output hub; and
a torsional vibration damper interconnecting the turbine-piston shell and the output hub.

4. The hydrokinetic torque coupling device of claim 3, wherein the torsional vibration damper comprises a drive member non-movably connected to the turbine-piston shell and a driven member operatively coupled to the output hub, and wherein the drive member is axially movable relative to the driven member of the torsional vibration damper.

5. The hydrokinetic torque coupling device of claim 3, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

6. The hydrokinetic torque coupling device of claim 3, further comprising a drive member interconnecting the turbine-piston shell to the torsional vibration damper, wherein the torsional vibration damper comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

7. The hydrokinetic torque coupling device of claim 1, wherein the restriction element comprises an annular restrictor flange member extending substantially axially from a distal end of the turbine-piston flange of the turbine-piston, the restrictor flange member including at least one passage permitting fluid communication between the first and second chambers when the hydrokinetic torque coupling device is out of the lockup mode.

8. The hydrokinetic torque coupling device of claim 7, wherein the at least one passage is configured as an axial groove on a cylindrical outer peripheral surface of the restrictor flange member.

9. The hydrokinetic torque coupling device of claim 1, wherein the restriction element comprises an annular washer having a radially inner end portion non-moveably attached to the turbine-piston flange of the turbine-piston and a radially outer end portion slidably engaging a radially inner peripheral surface of the casing, the annular washer comprising at least one passage permitting fluid communication between the first and second chambers when the hydrokinetic torque coupling device is out of the lockup mode.

10. The hydrokinetic torque coupling device of claim 9, wherein the at least one passage is situated radially outside of the turbine-piston flange.

11. The hydrokinetic torque coupling device of claim 1, wherein the restriction element comprises an annular washer having a radially outer end portion mounted to the casing and a radially inner end portion slidably engaging the turbine-piston flange of the turbine-piston, the annular washer comprising at least one passage permitting fluid communication between the first and second chambers when the hydrokinetic torque coupling device is out of the lockup mode.

12. The hydrokinetic torque coupling device of claim 11, wherein the radially outer end portion of the annular washer axially abuts an axial peripheral surface of the casing shell.

13. The hydrokinetic torque coupling device of claim 11, wherein the radially outer end portion of the annular washer is non-rotatably mounted to the casing.

14. The hydrokinetic torque coupling device of claim 13, wherein the at least one passage is situated radially outside of the turbine-piston flange.

15. The hydrokinetic torque coupling device of claim 13, wherein the at least one fluid passage is disposed between the turbine-piston flange and the radially inner end portion of the annular washer.

16. A hydrokinetic torque coupling device for coupling together a driving shaft and a driven shaft, the torque coupling device comprising:
a casing rotatable about a rotational axis and having an interior volume, the casing comprising a casing shell and an impeller shell disposed axially opposite to and fixedly connected to the casing shell;
an impeller coaxially aligned with the rotational axis and comprising the impeller shell, the impeller shell comprising a piston engagement portion having a first engagement surface;
an impeller coaxially aligned with the rotational axis and comprising the impeller shell, the impeller shell comprising a piston engagement portion having a first engagement surface;
a turbine-piston coaxially aligned with and hydrodynamically drivable by the impeller, the turbine-piston comprising a turbine-piston shell comprising a turbine-piston flange and partitioning the interior volume of the casing into a first chamber between the impeller shell and the turbine-piston shell and a second chamber between the turbine-piston shell and the casing shell, the turbine-piston flange having a second engagement surface facing the first engagement surface and movable axially toward and away from the first engagement surface to position the hydrokinetic torque coupling device into and out of a lockup mode in which the turbine-piston is mechanically locked with the piston engagement portion so as to be non-rotatable relative to the casing; and
a restriction element configured to restrict fluid flow and create a pressure drop between the first and second chambers when the hydrokinetic torque coupling device is out of the lockup mode;
the restriction element comprises an annular washer having a radially outer end portion mounted to the casing and a radially inner end portion slidably engaging the turbine-piston flange of the turbine-piston, the annular washer comprising at least one passage permitting fluid communication between the first and second chambers when the hydrokinetic torque coupling device is out of the lockup mode;
the radially outer end portion of the annular washer non-rotatably mounted to the casing;
the at least one fluid passage disposed between the turbine-piston flange and the radially inner end portion of the annular washer;
the annular washer including at least one substantially annular fulcrum at the radially inner end portion of the annular washer and slidably engaging the turbine-piston flange of the turbine-piston, the at least one fluid passage comprising a radial passage through the annular fulcrum.

17. The hydrokinetic torque coupling device of claim 1, wherein the restriction element comprises an annular sealing ring having a proximal end portion non-moveably secured to the turbine-piston shell and a distal end portion extending from the turbine-piston shell toward the impeller.

18. The hydrokinetic torque coupling device of claim 17, wherein the impeller shell includes an annular groove receiving the distal end portion of the sealing ring.

19. A method of assembling a hydrokinetic torque coupling device for coupling a driving shaft and a driven shaft together, comprising:
providing a torque converter comprising
an impeller comprising an impeller shell and a plurality of impeller blades, the impeller shell comprising a piston engagement portion integral with the impeller shell and having a first engagement surface;
a turbine-piston coaxially aligned with and hydrodynamically drivable by the impeller, the turbine-piston comprising a turbine-piston shell and a plurality of turbine blades, the turbine-piston shell comprising a turbine-piston flange integral with the turbine-piston shell and having a second engagement surface facing the first engagement surface, the turbine-piston flange with the turbine-piston shell movable axially toward and away from the first engagement surface to position the hydrokinetic torque coupling device into and out of a lockup mode in which the turbine-piston is mechanically locked with so as to be non-rotatable relative to the piston engagement portion; and
combining the torque converter with a restriction element and a casing shell to provide a structure in which (i) the casing shell and the impeller shell collectively establish a casing of the hydrokinetic torque coupling device, (ii) the turbine-piston shell is positioned in the casing to partition an interior volume of the casing into a first chamber between the impeller shell and the turbine-piston shell and a second chamber between the turbine-piston shell and the casing shell, and (iii) the restriction element is positioned to restrict fluid flow and create a pressure drop between the first and second chambers when the hydrokinetic torque device is out of the lockup mode.

20. A method of coupling a driving shaft and a driven shaft together with a hydrokinetic torque coupling device, the hydrokinetic torque coupling device comprising a casing that is rotatable about a rotational axis and comprises a casing shell and an impeller shell disposed axially opposite to and fixedly connected to the casing shell, an impeller that comprises the impeller shell and a piston engagement portion integral with the impeller shell and having a first engagement surface, a turbine-piston that comprises a turbine-piston shell, and a restriction element, wherein the turbine-piston shell comprises a turbine-piston flange integral with the turbine-piston shell and having a second engagement surface and partitions an interior volume of the casing into a first chamber between the impeller shell and the turbine-piston shell and a second chamber between the turbine-piston shell and the casing shell, the method comprising:

operatively connecting the driving shaft and the driven shaft to input and output parts of the hydrokinetic torque coupling device;

controlling axial movement of the turbine-piston shell of the turbine-piston toward and away from the first engagement surface of the piston engagement portion to position the hydrokinetic torque coupling device into and out of a lockup mode in which the turbine-piston is mechanically locked with so as to be non-rotatable relative to the piston engagement portion; and restricting fluid flow and creating a pressure drop between the first and second chambers with the restriction element when the hydrokinetic torque device is out of the lockup mode.

* * * * *